(12) United States Patent
Mehta et al.

(10) Patent No.: US 11,237,915 B2
(45) Date of Patent: *Feb. 1, 2022

(54) RECOVERY POINT OBJECTIVE (RPO) DRIVEN BACKUP SCHEDULING IN A DATA STORAGE MANAGEMENT SYSTEM

(71) Applicant: Commvault Systems, Inc., Tinton Falls, NJ (US)

(72) Inventors: Bhavyan Bharatkumar Mehta, Mumbai (IN); Anand Vibhor, Manalapan, NJ (US); Amey Vijaykumar Karandikar, Long Branch, NJ (US); Gokul Pattabiraman, Eatontown, NJ (US); Hemant Mishra, Englishtown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,754

(22) Filed: Jul. 20, 2020

(65) Prior Publication Data

US 2020/0364112 A1 Nov. 19, 2020

Related U.S. Application Data

(63) Continuation of application No. 15/973,314, filed on May 7, 2018, now Pat. No. 10,754,729.

(60) Provisional application No. 62/641,868, filed on Mar. 12, 2018.

(51) Int. Cl.
*G06F 11/14* (2006.01)
*G06F 3/06* (2006.01)

(52) U.S. Cl.
CPC .......... *G06F 11/1451* (2013.01); *G06F 3/061* (2013.01); *G06F 3/0605* (2013.01);
(Continued)

(58) Field of Classification Search
None
See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

EP 0259912 3/1988
EP 0405926 1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — William E. Baughman
(74) *Attorney, Agent, or Firm* — Commvault Systems, Inc.

(57) ABSTRACT

To perform Recovery Point Objective (RPO) driven backup scheduling, the illustrative data storage management system is enhanced in several dimensions. Illustrative enhancements include: streamlining the user interface to take in fewer parameters; backup job scheduling is largely automated based on several factors, and includes automatic backup level conversion for legacy systems; backup job priorities are dynamically adjusted to re-submit failed data objects with an "aggressive" schedule in time to meet the RPO; only failed items are resubmitted for failed backup jobs.

20 Claims, 23 Drawing Sheets

(52) U.S. Cl.
    CPC ............ *G06F 3/067* (2013.01); *G06F 3/0649*
           (2013.01); *G06F 11/1461* (2013.01); *G06F*
           *11/1464* (2013.01); *G06F 2201/80* (2013.01);
                               *G06F 2201/82* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,758,359 A | 5/1998 | Saxon |
| 5,907,672 A | 5/1999 | Matz |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,423,731 B1 | 4/2013 | Nadathur |
| 8,495,315 B1 | 7/2013 | Rudolph |
| 8,578,120 B2 | 11/2013 | Attarde et al. |
| 8,769,048 B2 | 7/2014 | Kottomtharayil |
| 8,954,446 B2 | 2/2015 | Vijayan Retnamma et al. |
| 8,977,672 B2 | 3/2015 | Karandikar |
| 9,020,900 B2 | 4/2015 | Vijayan Retnamma et al. |
| 9,098,495 B2 | 8/2015 | Gokhale |
| 9,235,582 B1 | 1/2016 | Madiraju Varadaraju |
| 9,239,687 B2 | 1/2016 | Vijayan et al. |
| 9,633,033 B2 | 4/2017 | Vijayan et al. |
| 9,639,274 B2 | 5/2017 | Maranna et al. |
| 9,690,666 B1 | 6/2017 | Shembavnekar |
| 10,162,714 B2 | 12/2018 | Hohl et al. |
| 10,754,729 B2 | 8/2020 | Mehta |
| 10,761,942 B2 | 9/2020 | Mehta et al. |
| 10,860,443 B2 | 12/2020 | Dwarampudi et al. |
| 2003/0101155 A1 | 5/2003 | Gokhale et al. |
| 2006/0224846 A1 | 10/2006 | Amarendran et al. |
| 2009/0319534 A1 | 12/2009 | Gokhale |
| 2009/0320029 A1 | 12/2009 | Kottomtharayil |
| 2010/0070725 A1 | 3/2010 | Prahlad |
| 2010/0274983 A1 | 10/2010 | Murphy |
| 2012/0150818 A1 | 6/2012 | Vijayan Retnamma et al. |
| 2012/0150826 A1 | 6/2012 | Vijayan Retnamma et al. |
| 2013/0332505 A1 | 12/2013 | Karandikar |
| 2014/0201170 A1 | 7/2014 | Vijayan et al. |
| 2014/0279922 A1 | 9/2014 | Kottomtharayil |
| 2014/0337285 A1 | 11/2014 | Gokhale |
| 2015/0186487 A1 | 7/2015 | Karandikar |
| 2016/0140199 A1 | 5/2016 | Karandikar |
| 2016/0350391 A1 | 12/2016 | Vijayan et al. |
| 2016/0371153 A1 | 12/2016 | Dornemann et al. |
| 2016/0378616 A1 | 12/2016 | Wigmore et al. |
| 2017/0134487 A1 | 5/2017 | Karandikar |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0048705 A1 | 2/2018 | Karandikar |
| 2018/0067819 A1 | 3/2018 | Kotha |
| 2019/0155699 A1 | 5/2019 | Luo et al. |
| 2019/0278661 A1 | 9/2019 | Mehta et al. |
| 2019/0278663 A1 | 9/2019 | Mehta et al. |
| 2020/0183794 A1 | 6/2020 | Dwarampudi et al. |
| 2021/0056001 A1 | 2/2021 | Dwarampudi et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.

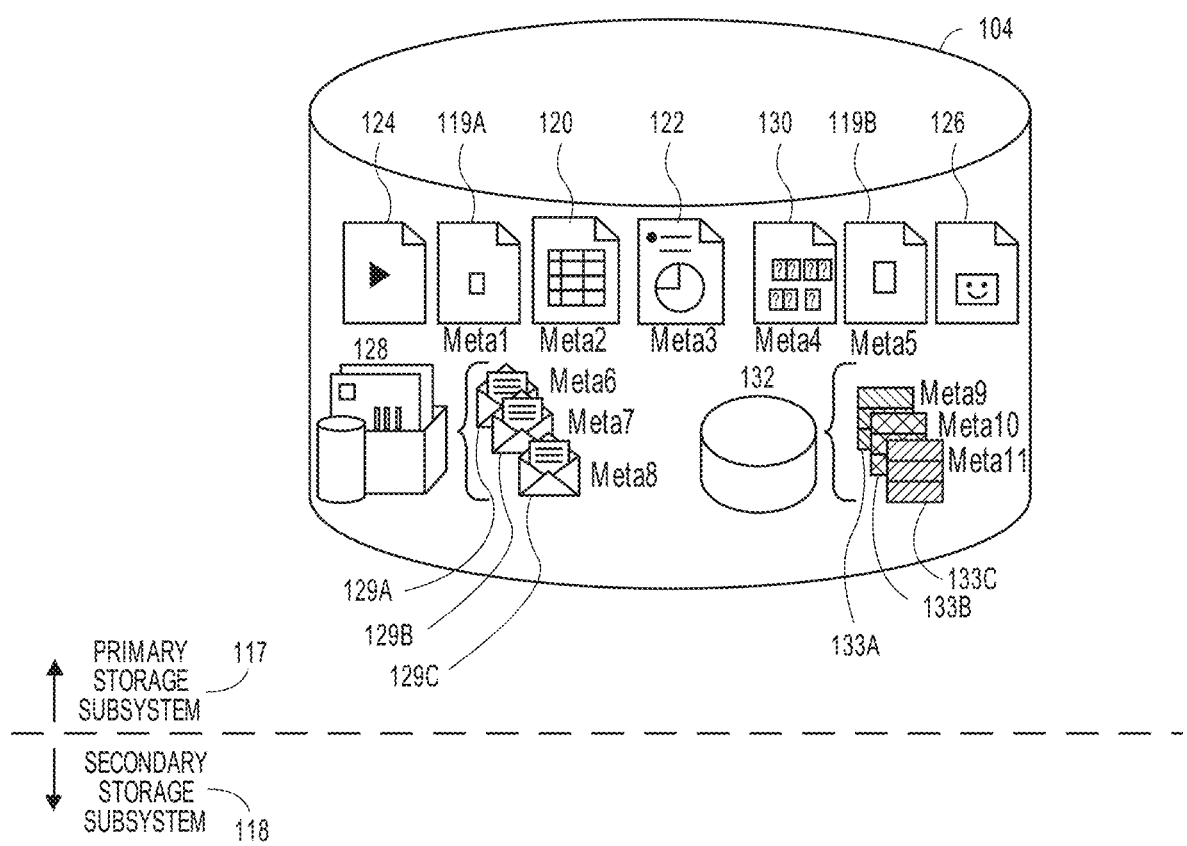
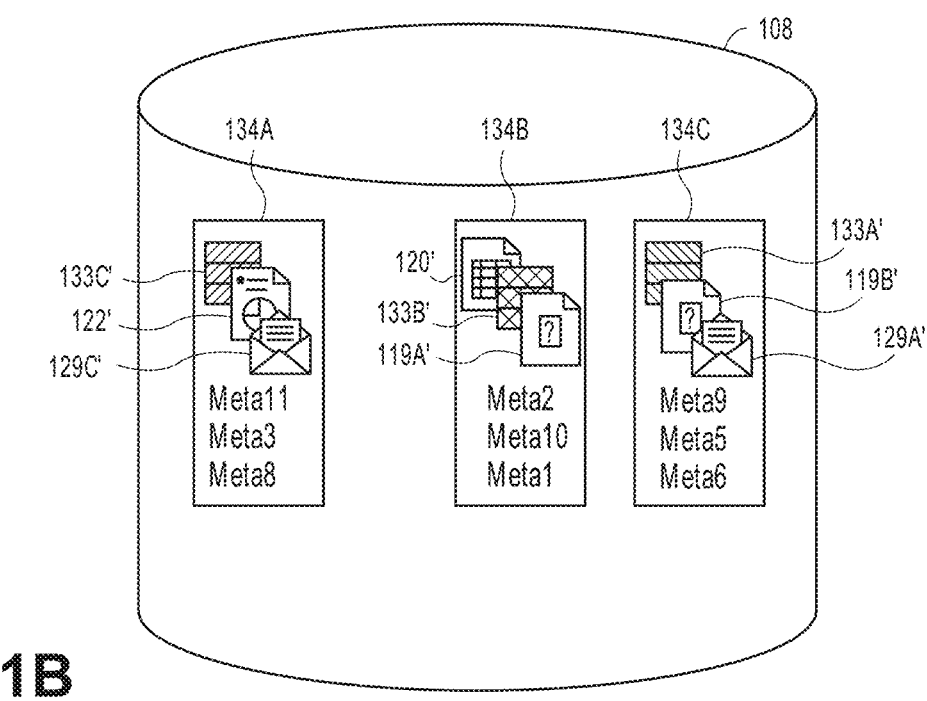
FIG. 1B

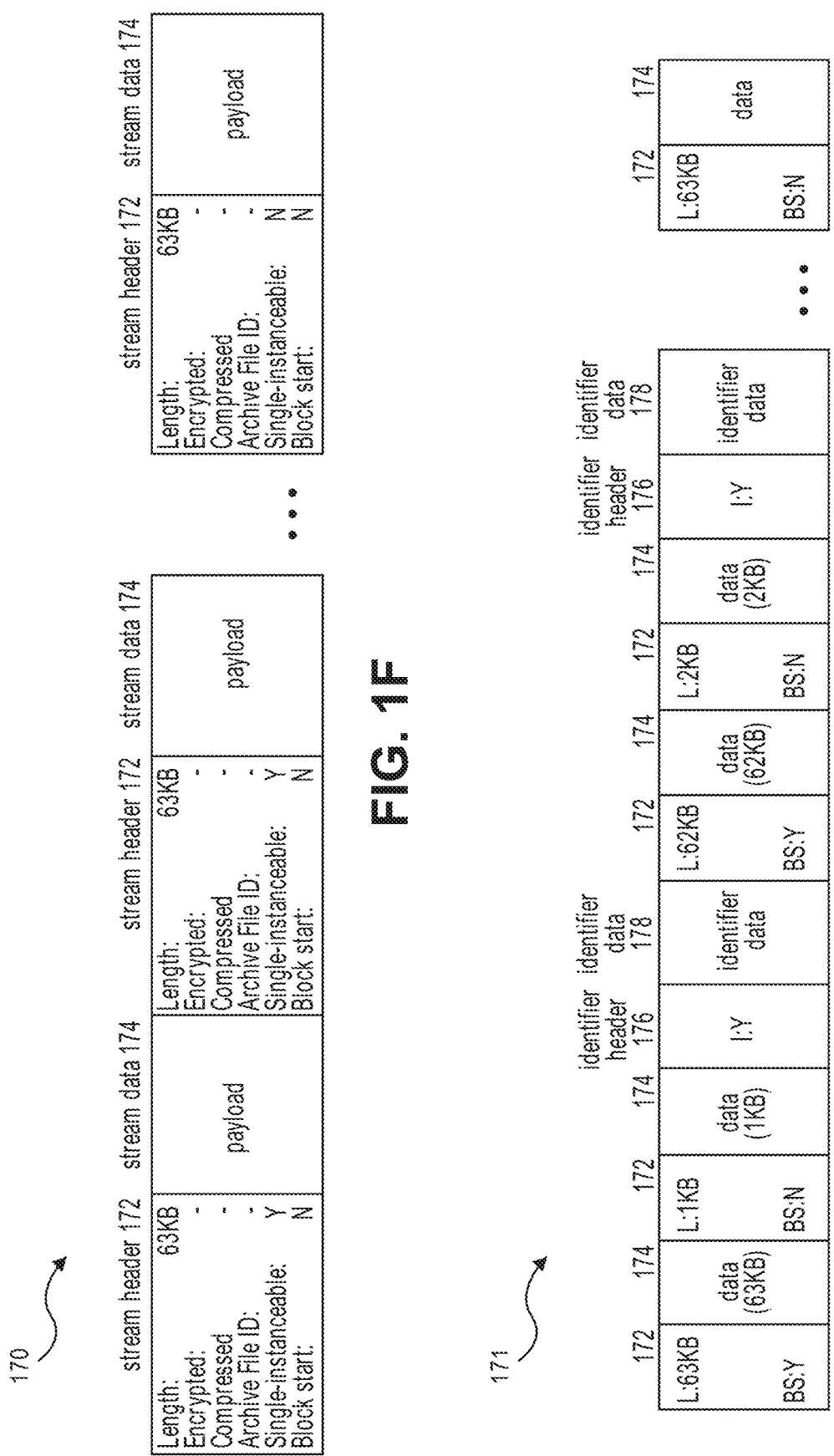

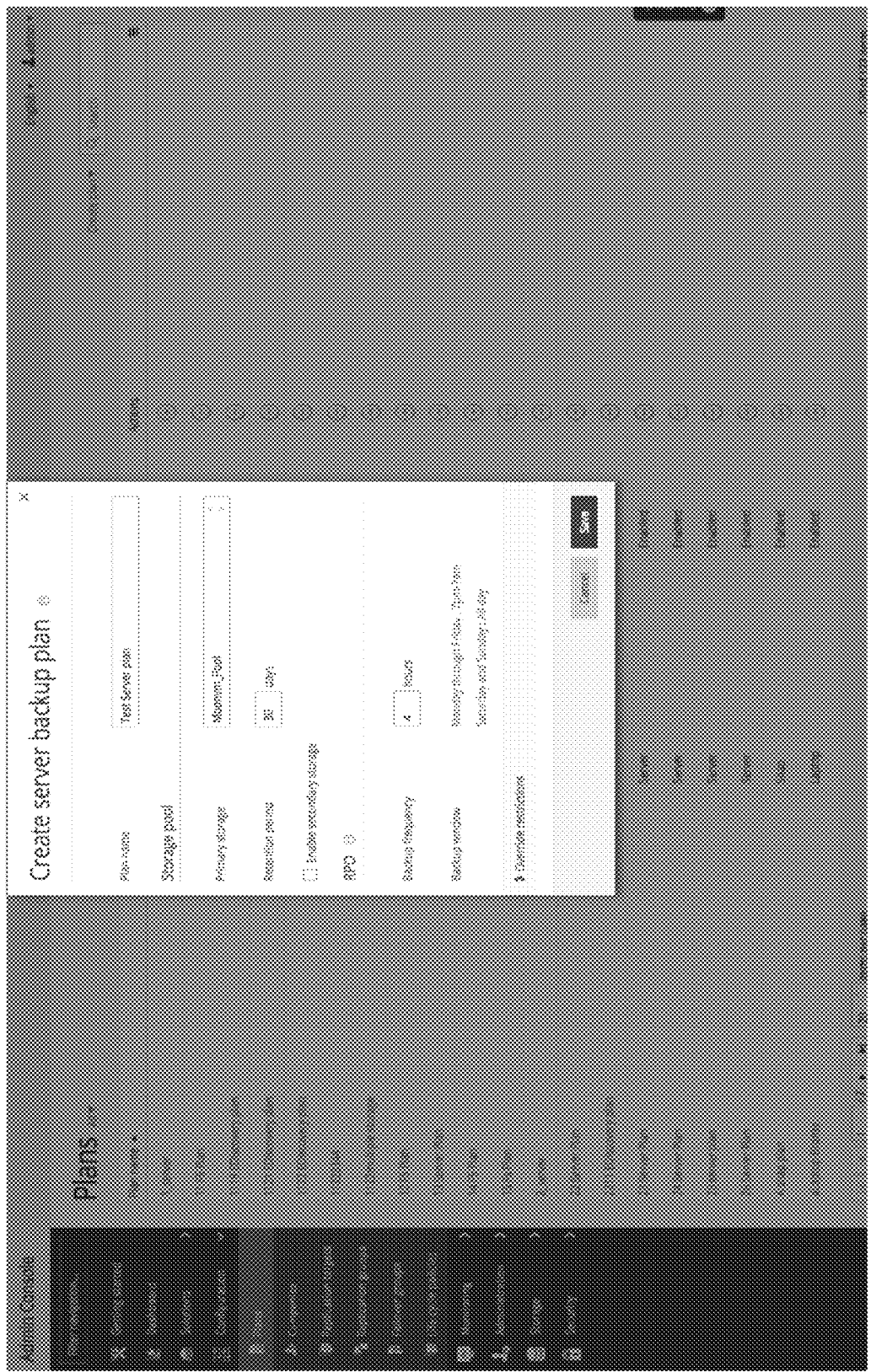
FIG. 3  Illustrative Screenshot Showing Creating An RPO-Driven Backup Plan For A Server, Including An Illustrative Backup Frequency And Backup Window.

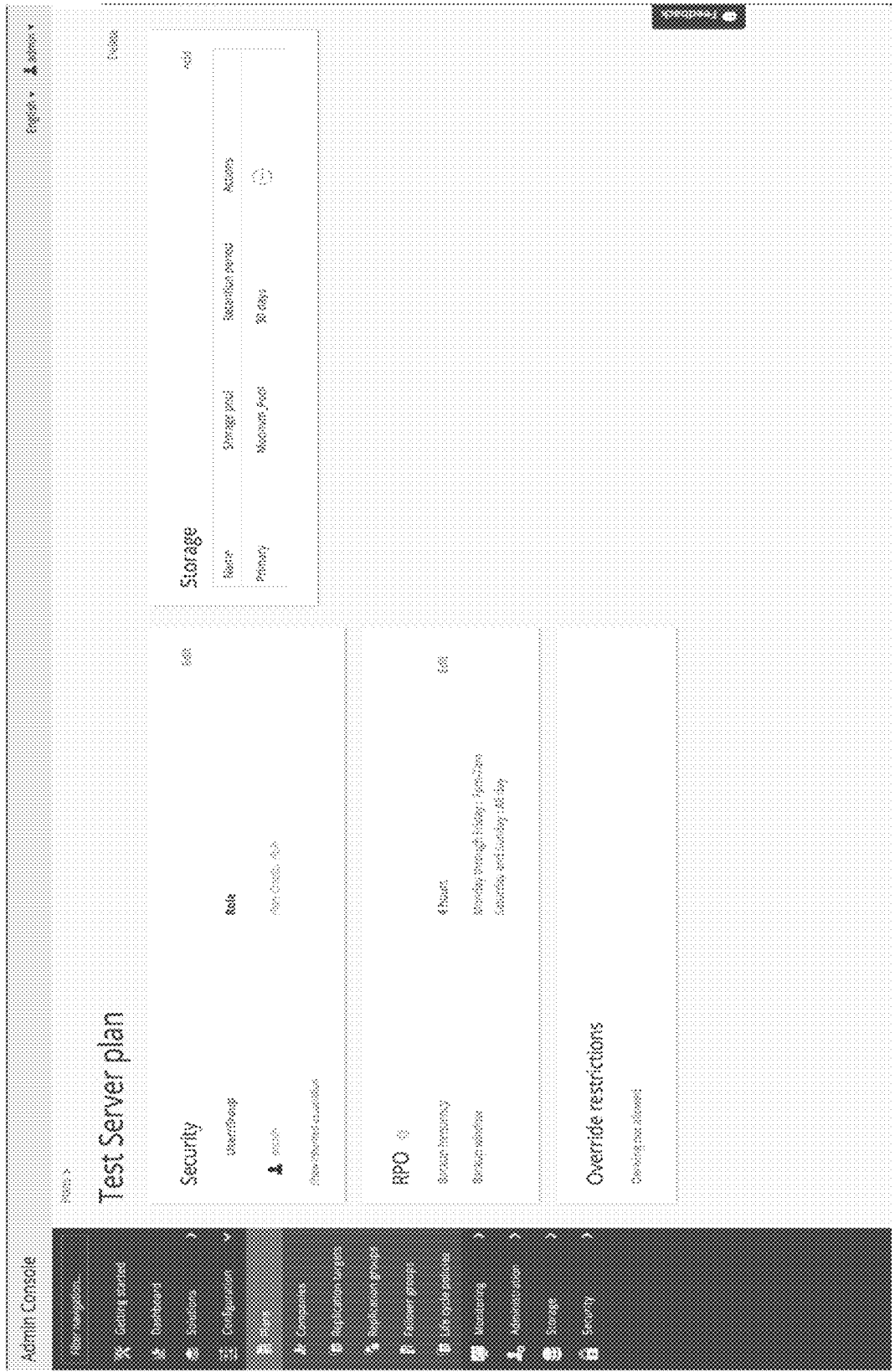
FIG. 4 Illustrative Screenshot Depicting RPO-Driven Backup Plan For A Server Target, Including An Illustrative Backup Frequency, Backup Window, And Retention Period

FIG. 5   Detail Showing Backup Frequency And Backup Window For An RPO-Driven Backup Plan

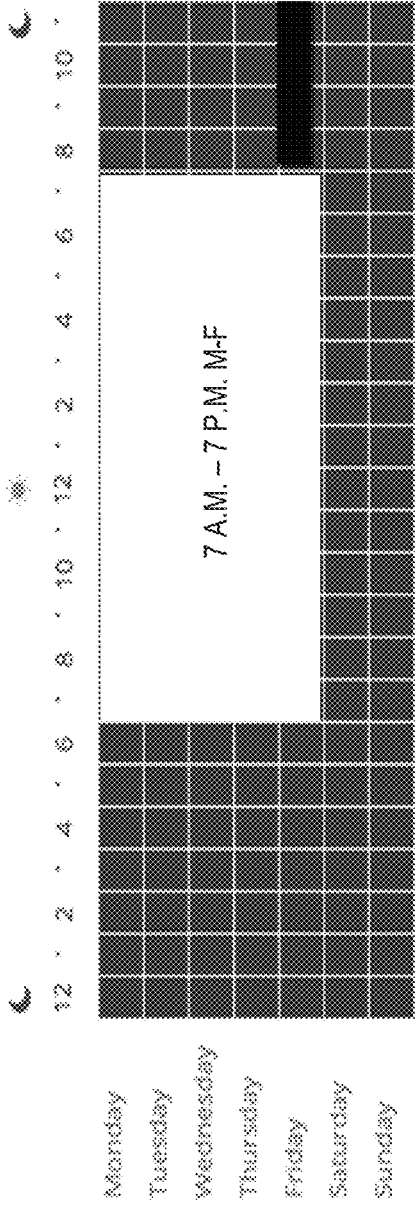
FIG. 6 Illustrative Screenshot Showing An Editable Backup Window For An RPO-Driven Backup Plan

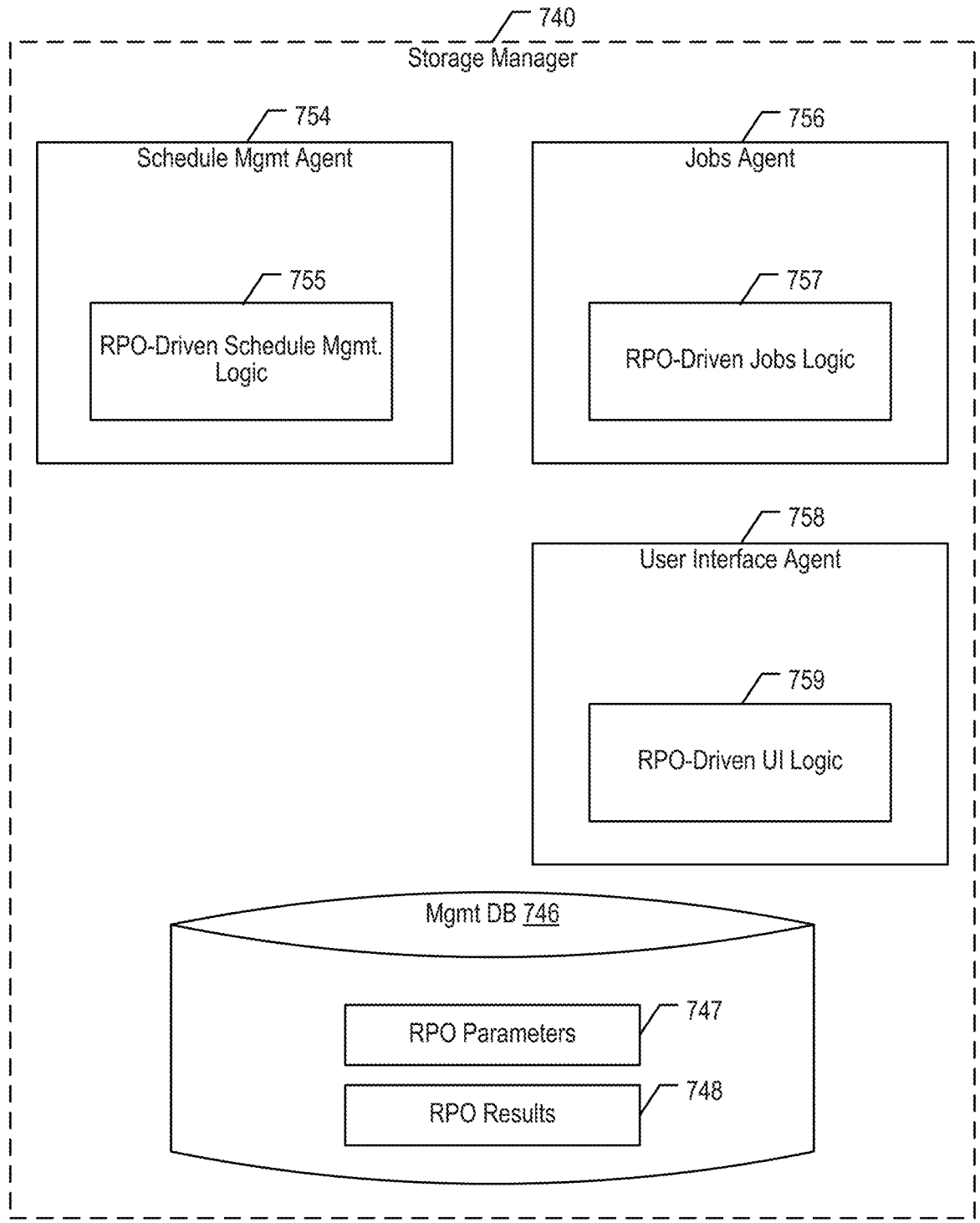
FIG. 7    Example Enhanced Storage Manager For RPO-Driven Backup Scheduling

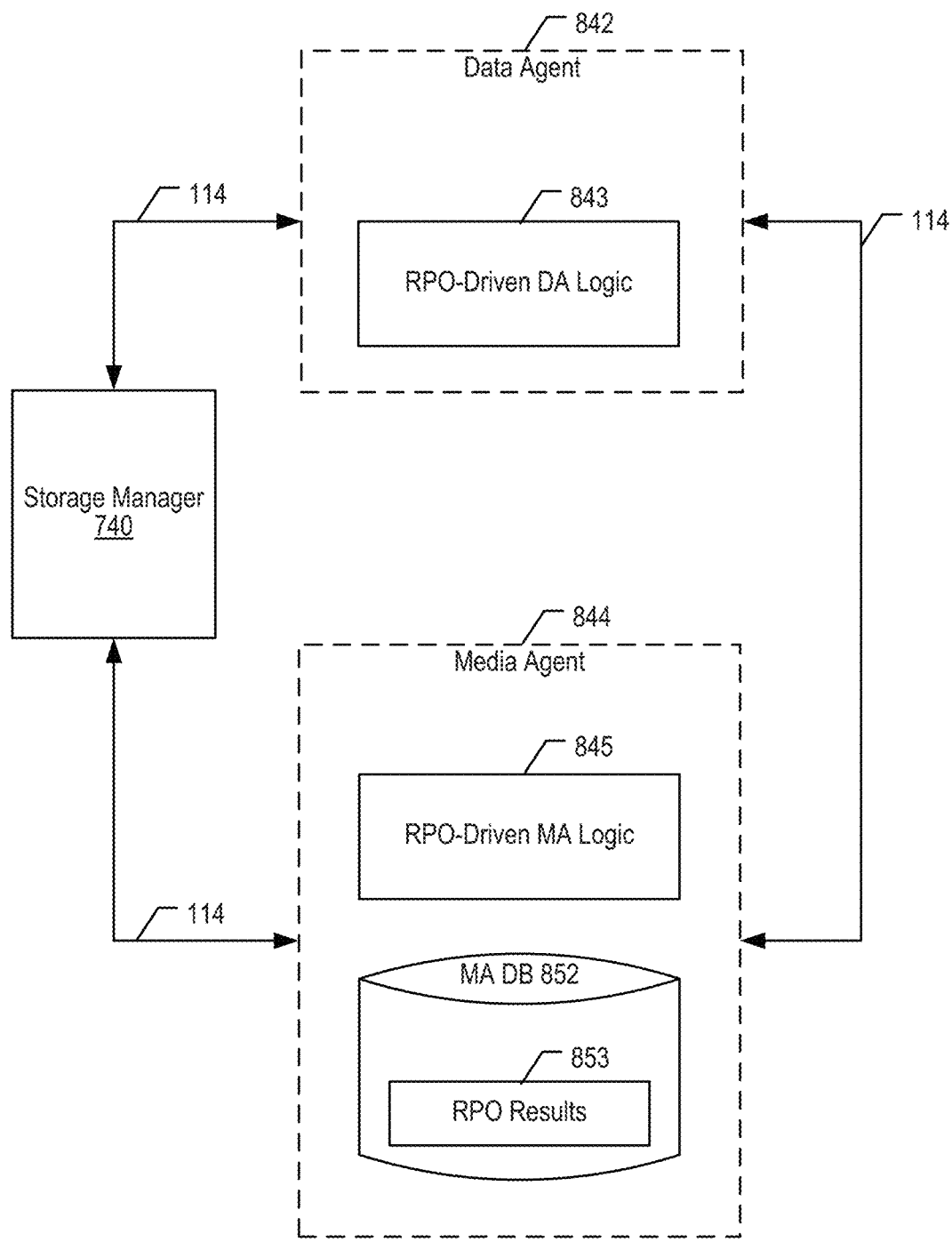
FIG. 8  Illustrative Enhanced Data Agent And Media Agent In Communication With Enhanced Storage Manager For RPO-Driven Backup Scheduling

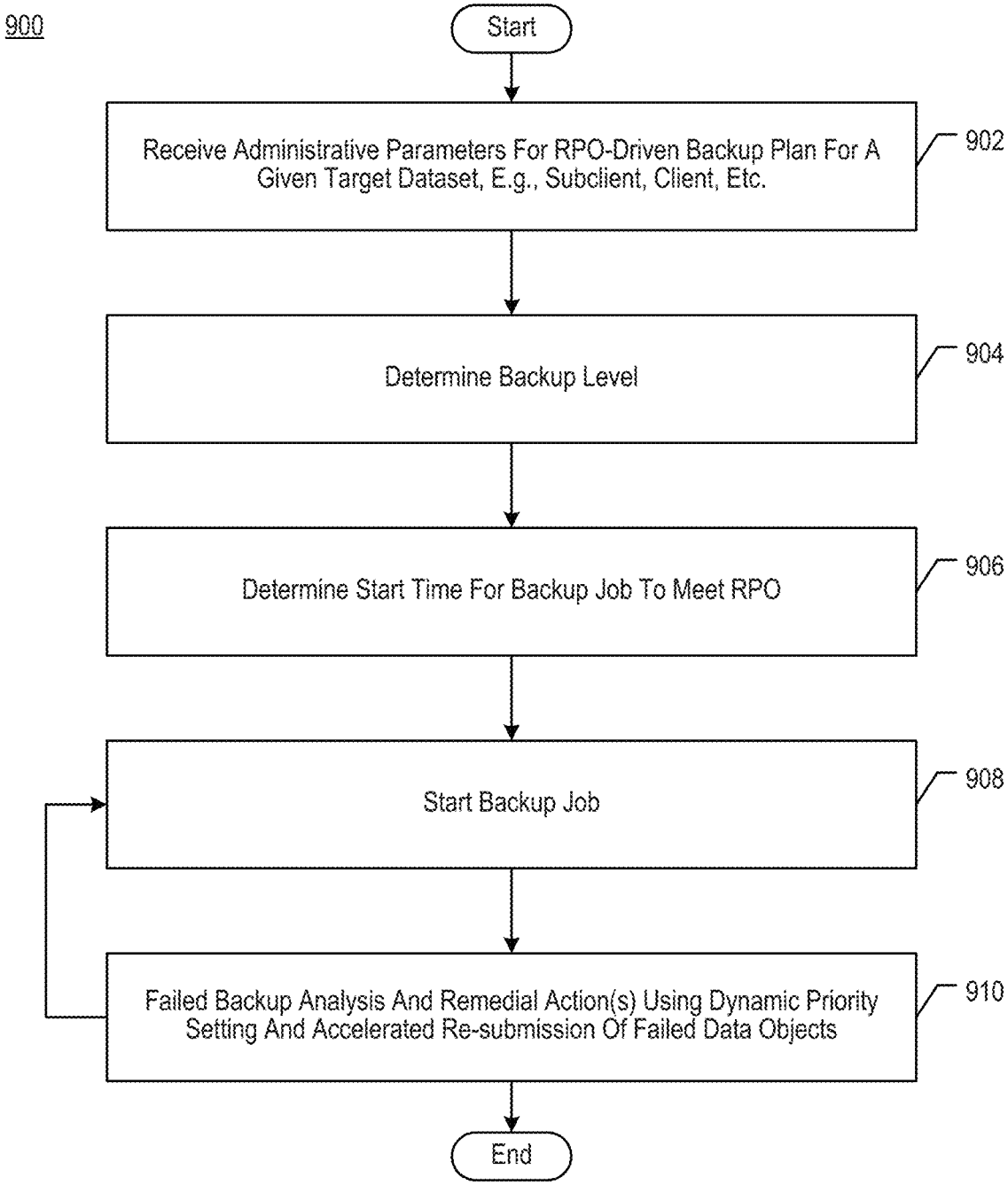
FIG. 9 — Illustrative Method Performed By Enhanced Storage Manager, E.g., Using Logic 755, 757 And Database 746

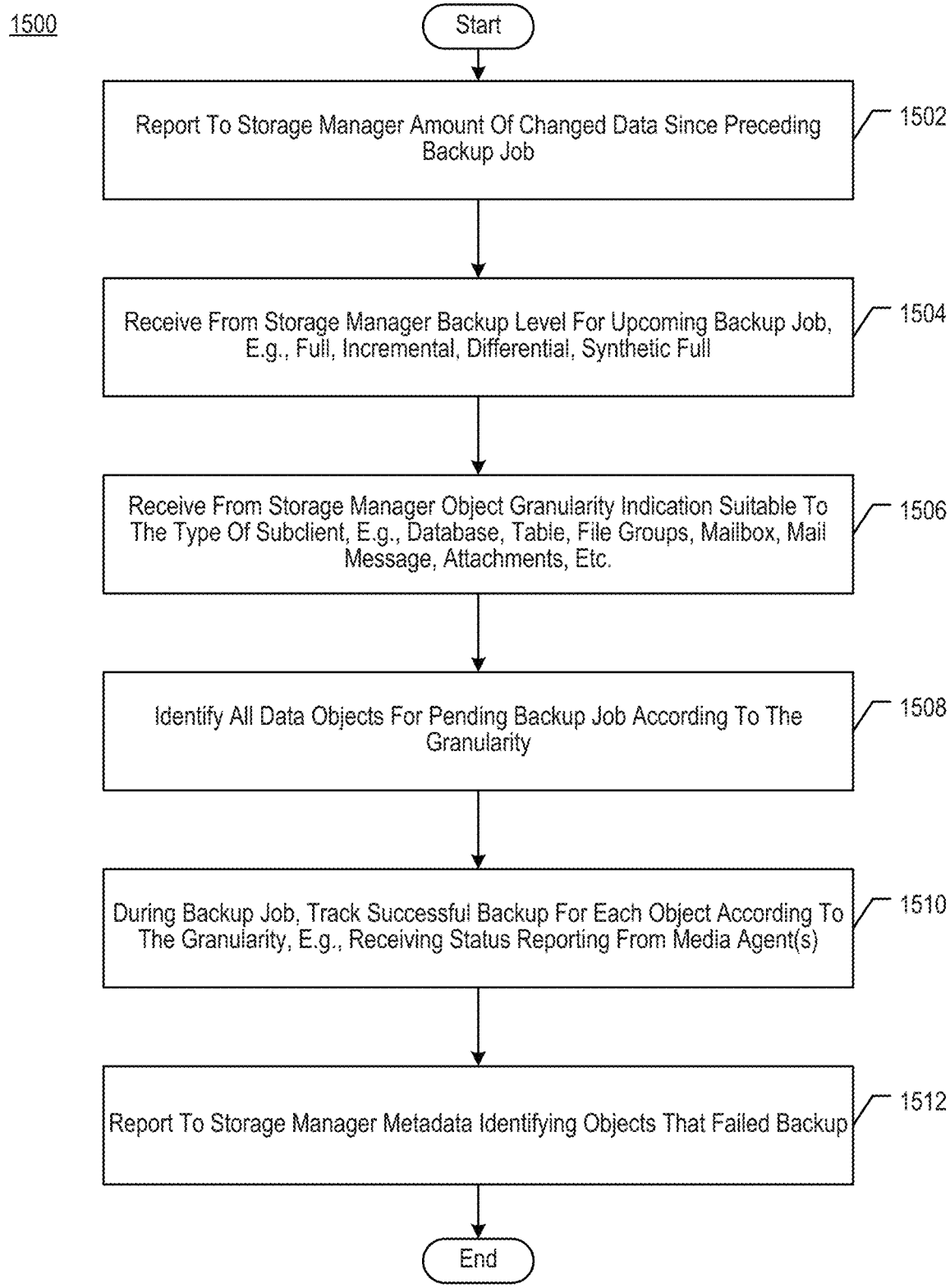
FIG. 15  Illustrative Method Performed By Enhanced Data Agent 842

RECOVERY POINT OBJECTIVE (RPO) DRIVEN BACKUP SCHEDULING IN A DATA STORAGE MANAGEMENT SYSTEM

INCORPORATION BY REFERENCE TO ANY PRIORITY APPLICATIONS

The present application is a Continuation of U.S. patent application Ser. No. 15/973,314 filed on 7 May 2018, which claims priority from U.S. Provisional Patent Application Ser. No. 62/641,868 filed on 12 Mar. 2018. Any and all applications for which a foreign or domestic priority claim is identified in the Application Data Sheet of the present application are hereby incorporated herein by reference in their entireties under 37 CFR 1.57. The present application is also related to U.S. patent application Ser. No. 15/973,296 filed on 7 May 2018, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable and cost-effective ways to protect the information stored on their computer networks while minimizing impact on productivity. A company might back up critical computing systems such as databases, file servers, web servers, virtual machines, and so on using maintenance schedules. Given the rapidly expanding volume of data under management, companies also continue to seek innovative techniques for managing data growth and data protection.

SUMMARY

A Recovery Point Objective (RPO) in reference to a data storage management system is the maximum duration (e.g., number of hours) that data can be lost during a service disruption, i.e., how much data loss can be tolerated in terms of time since a recoverable backup. In an illustrative data storage management system, an RPO value is configured into the system. Different RPOs can be defined for different portions of data being protected. For simplicity, we shall refer herein to RPO in the singular, even when multiple RPOs are configured within a single data storage management system. The RPO value can be compared against actual recovery figures, such as an Actual Recovery Point (RPA). This helps monitor the effectiveness of disaster recovery settings and operations of the data storage management system.

One problem that arises in traditional (prior art) data storage management systems is that system operators are required to work out backup schedules and re-work the schedules to satisfy the RPO. In many cases, this ad hoc approach fails to meet the RPO, resulting in unacceptable amounts of lost data. The present inventors devised a streamlined approach that largely relieves data center operators from having to figure out data protection (e.g., backup) schedules and instead provides an intelligent scheduling scheme that is based on the RPO. In this way, the RPO drives schedules by dynamically responding to historical as well as current conditions to trigger, re-prioritize, and/or accelerate backup operations. Accordingly, the approach is referred to herein as "RPO-driven backup scheduling."

To support RPO-driven backup scheduling, the illustrative data storage management system is enhanced in several dimensions. The illustrative RPO-driven backup scheduling can be set up for one or more of the following targets: servers, file systems, laptops and other mobile devices, virtual machines, databases, mail servers (e.g., Microsoft Exchange Server), etc., without limitation. Any target dataset, grouped as a client or subclient, can be subjected to RPO driven backup scheduling according to the illustrative embodiment, without limitation. To perform Recovery Point Objective (RPO) driven backup scheduling, the illustrative data storage management system is enhanced in several dimensions. Illustrative enhancements include: streamlining the user interface to take in fewer parameters; backup job scheduling is largely automated based on several factors, and includes automatic backup level conversion for legacy systems; backup job priorities are dynamically adjusted to re-submit failed data objects with an "aggressive" schedule in time to meet the RPO; only failed items are resubmitted for failed backup jobs.

According to the present invention, the illustrative data storage management system has been enhanced to relieve backup administrators from having to work through competing backup considerations to devise a backup schedule that can meet the RPO. Moreover, the illustrative data storage management system has been further enhanced to do more than human administrators were able to do in the prior art, e.g., break out data objects that failed in a backup job and re-submit them for backup on an accelerated schedule in another backup job so that the RPO can still be met; dynamically prioritize pending backup jobs so that the RPO can be met; automatically determine and implement a backup level (e.g., full, incremental, differential, synthetic full) based on RPO and backup job criteria so that the RPO can be met. Furthermore, these enhancements also lead to improved storage utilization, such as when the system determines that fewer or smaller secondary copies can be created and still meet RPO, thus using less storage space and fewer resources. Machine learning is used for analyzing past backup jobs, success/failure histories, and other characteristics of the data storage management environment available for backups.

BRIEF DESCRIPTION OF THE DRAWINGS

FIG. 1B is a detailed view of a primary storage device, a secondary storage device, and some examples of primary data and secondary copy data.

FIGS. 1F-1H are block diagrams illustrating suitable data structures that may be employed by the information management system.

FIG. 3 depicts an illustrative screenshot showing creating an RPO-driven server backup plan, including an illustrative backup frequency and backup window; other backup targets other than server include file system, laptop/mobile, virtual machines, databases, mail servers, without limitation.

FIG. 4 depicts an illustrative screenshot depicting RPO-driven backup plan for a server target, including an illustrative backup frequency and backup window.

FIG. 5 depicts detail showing backup frequency and backup window for an RPO-driven backup plan.

FIG. 6 depicts an illustrative screenshot showing an editable backup window for an RPO-driven backup plan.

FIG. 7 depicts an example enhanced storage manager for RPO-driven backup scheduling.

FIG. 8 depicts an illustrative enhanced data agent and media agent in communication with enhanced storage manager for RPO-driven backup scheduling.

FIG. 9 depicts a flow chart of an illustrative method 900 according to an illustrative embodiment of the present invention.

FIG. 15 depicts a flow chart of an illustrative method 1500 according to an illustrative embodiment of the present invention.

DETAILED DESCRIPTION

Detailed descriptions and examples of systems and methods according to one or more illustrative embodiments of the present invention may be found in the section entitled RECOVERY POINT OBJECTIVE (RPO) DRIVEN BACKUP SCHEDULING IN A DATA STORAGE MANAGEMENT SYSTEM, as well as in the section entitled Example Embodiments, and also in FIGS. 3-15 herein.

Components and functionality for RPO-driven backup scheduling may be configured and/or incorporated into information management systems such as those described herein in FIGS. 1A-1H and 2A-2C. Various embodiments described herein are intimately tied to, enabled by, and would not exist except for, computer technology. For example, machine learning, dynamic priority setting, automatic backup level conversions, etc. described herein in reference to various embodiments cannot reasonably be performed by humans alone, without the computer technology upon which they are implemented.

Data Storage Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
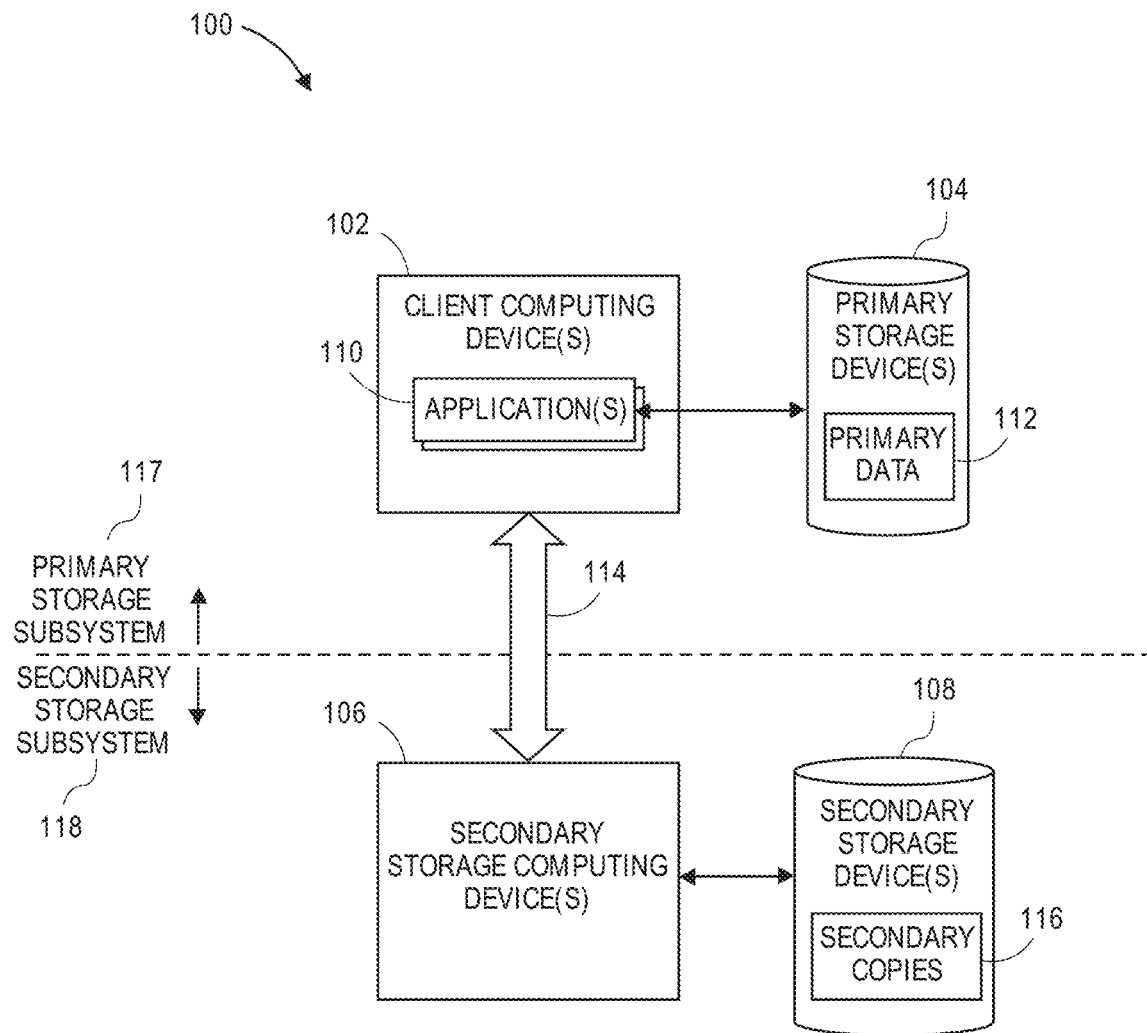
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. Patent Application No. 62/265,339 entitled "Live Synchronization and Management of Virtual Machines across Computing and Virtualization Platforms and Using Live Synchronization to Support Disaster Recovery";

U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information"; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
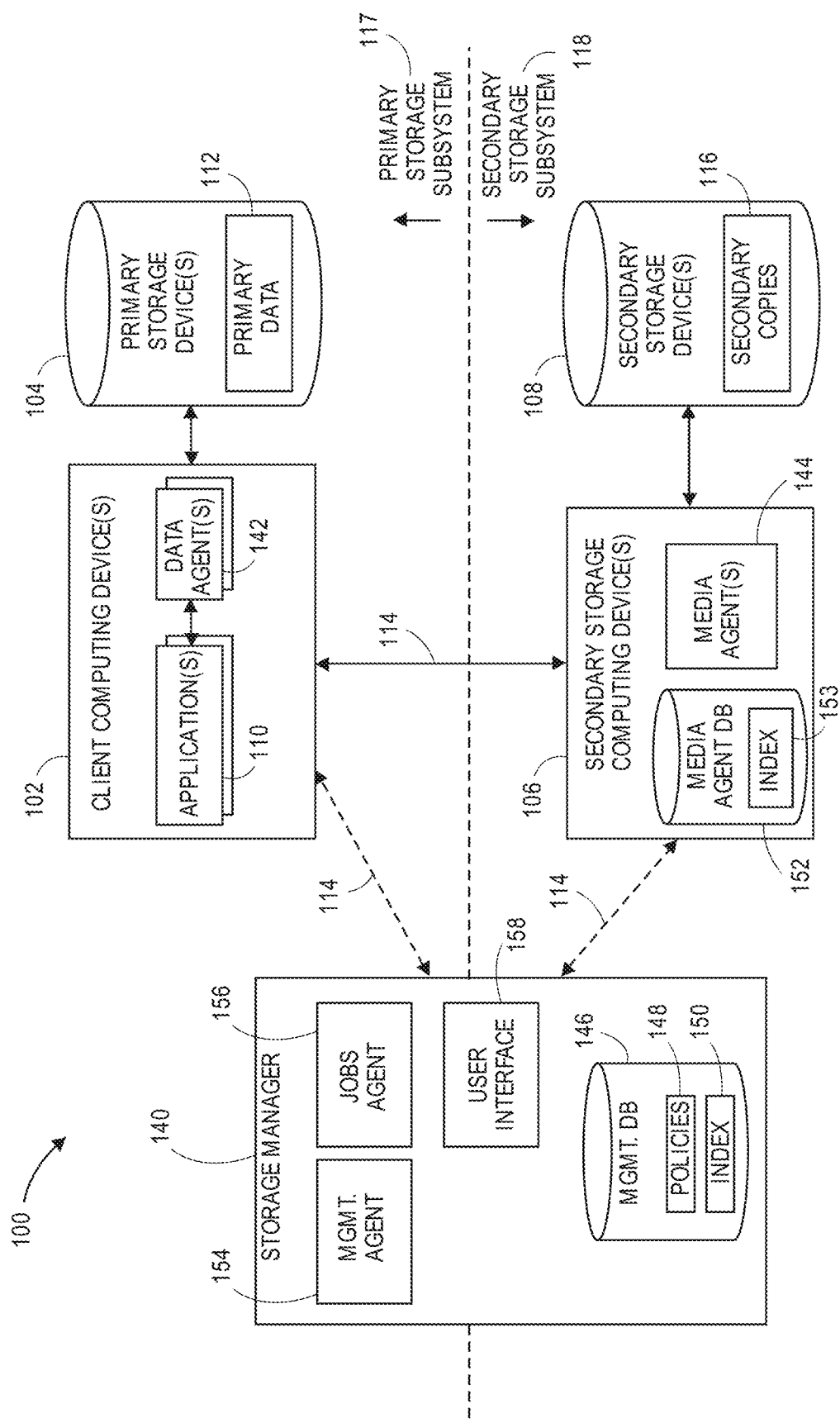
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
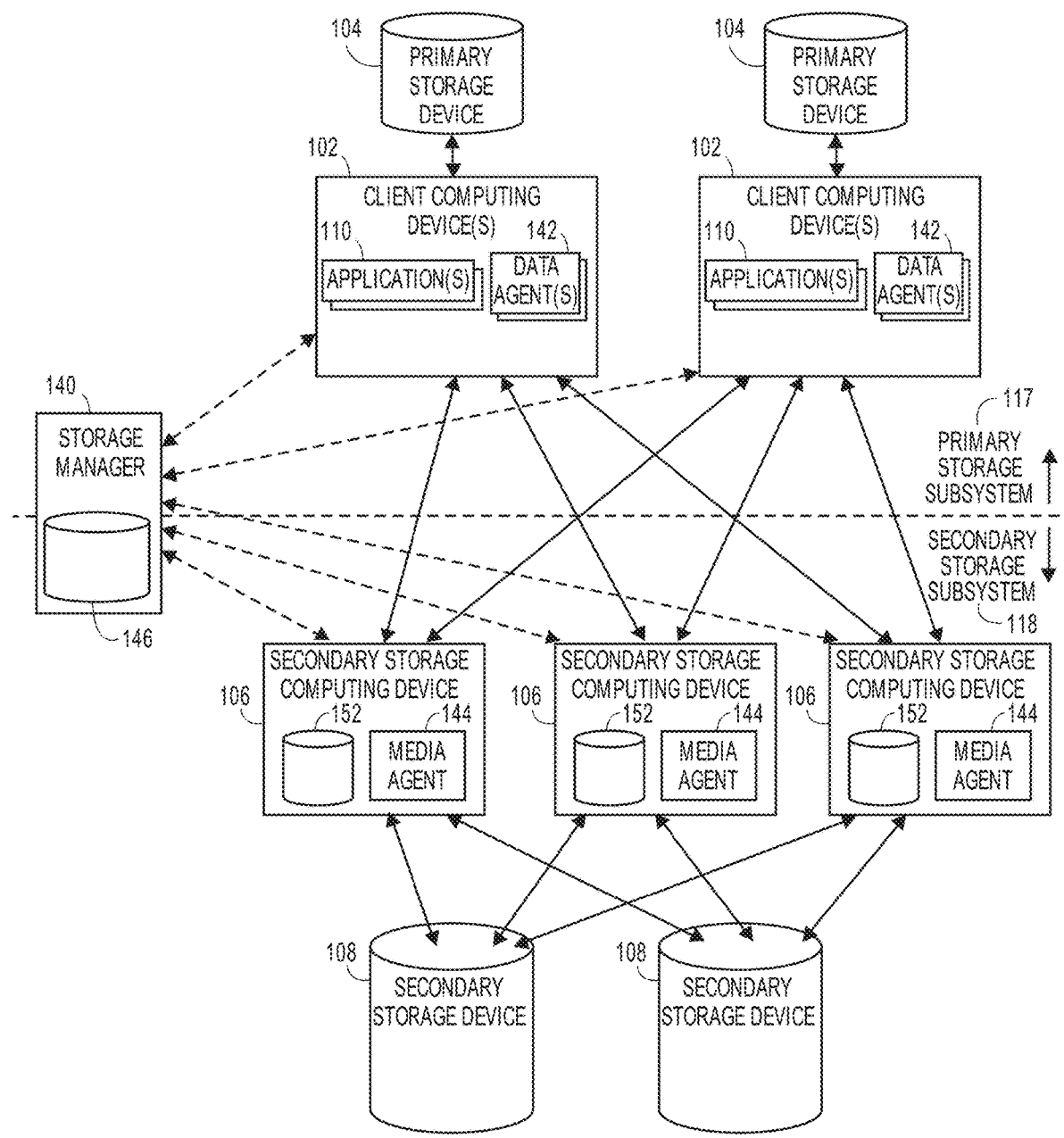
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images. Synthetic full backups consolidate the data from the latest full backup or synthetic full backup and any subsequent incremental and/or differential backups into one archive file, instead of reading and backing up data directly from the client computer. In some embodiments, bitmaps are created and the new backup images consolidate the index and user data stored in the related incremental, differential, and previous full backups into a synthetic backup file that fully represents the subclient (e.g., via pointers) but does not comprise all its constituent data. Since synthetic full backups do not back up data from the client computer, no load is imposed on the client computer.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient, client; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
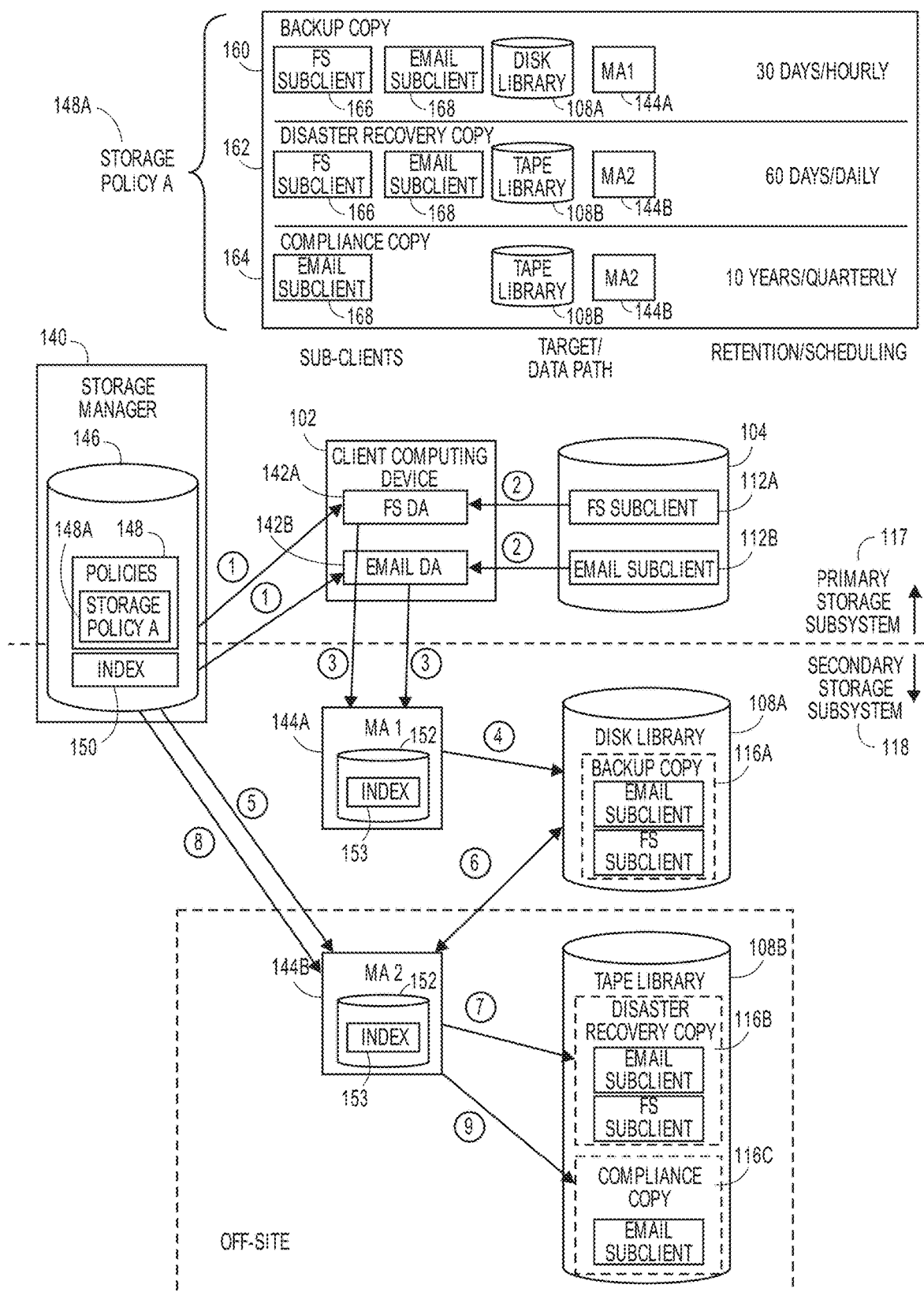
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may access data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
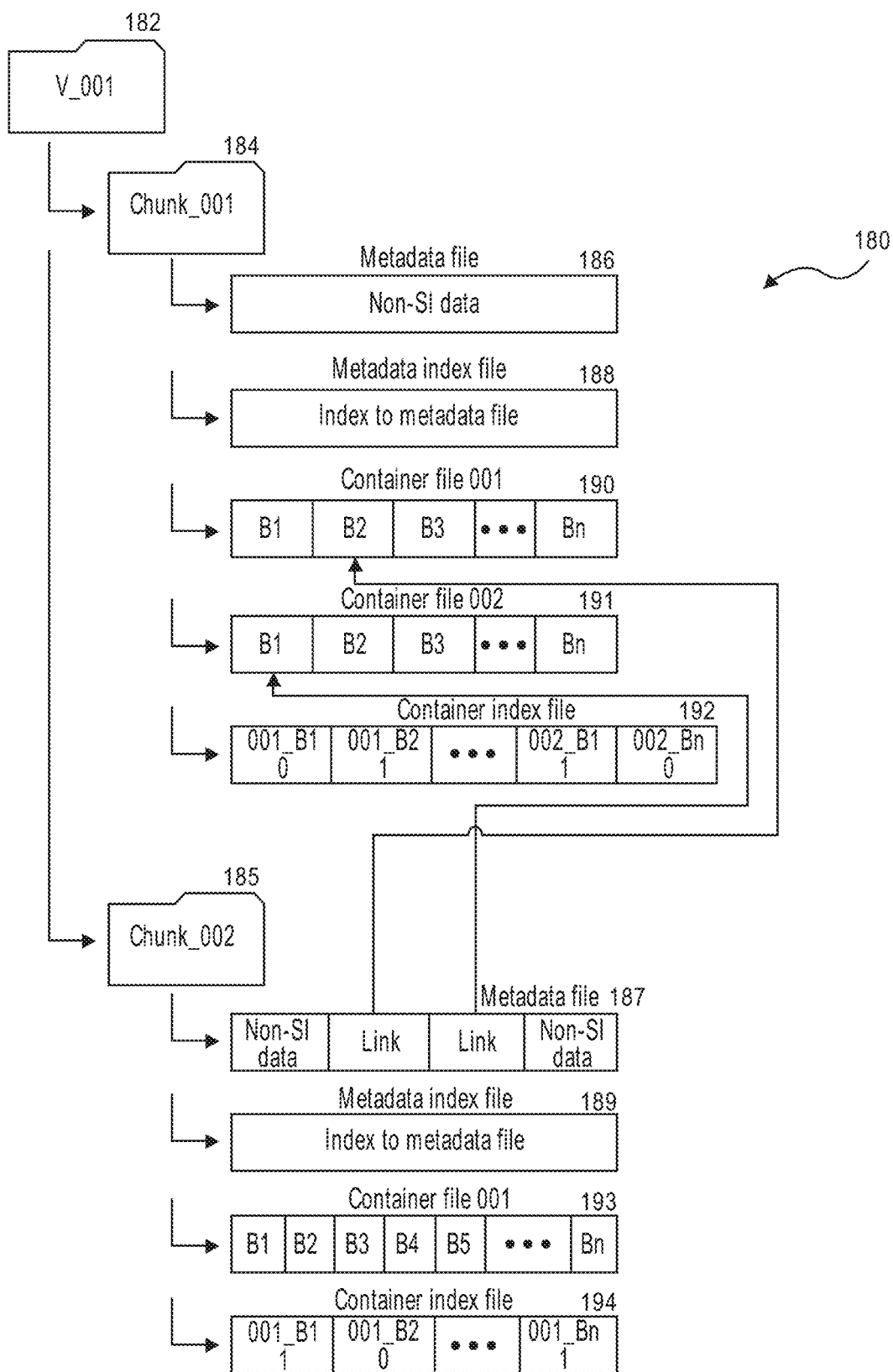

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
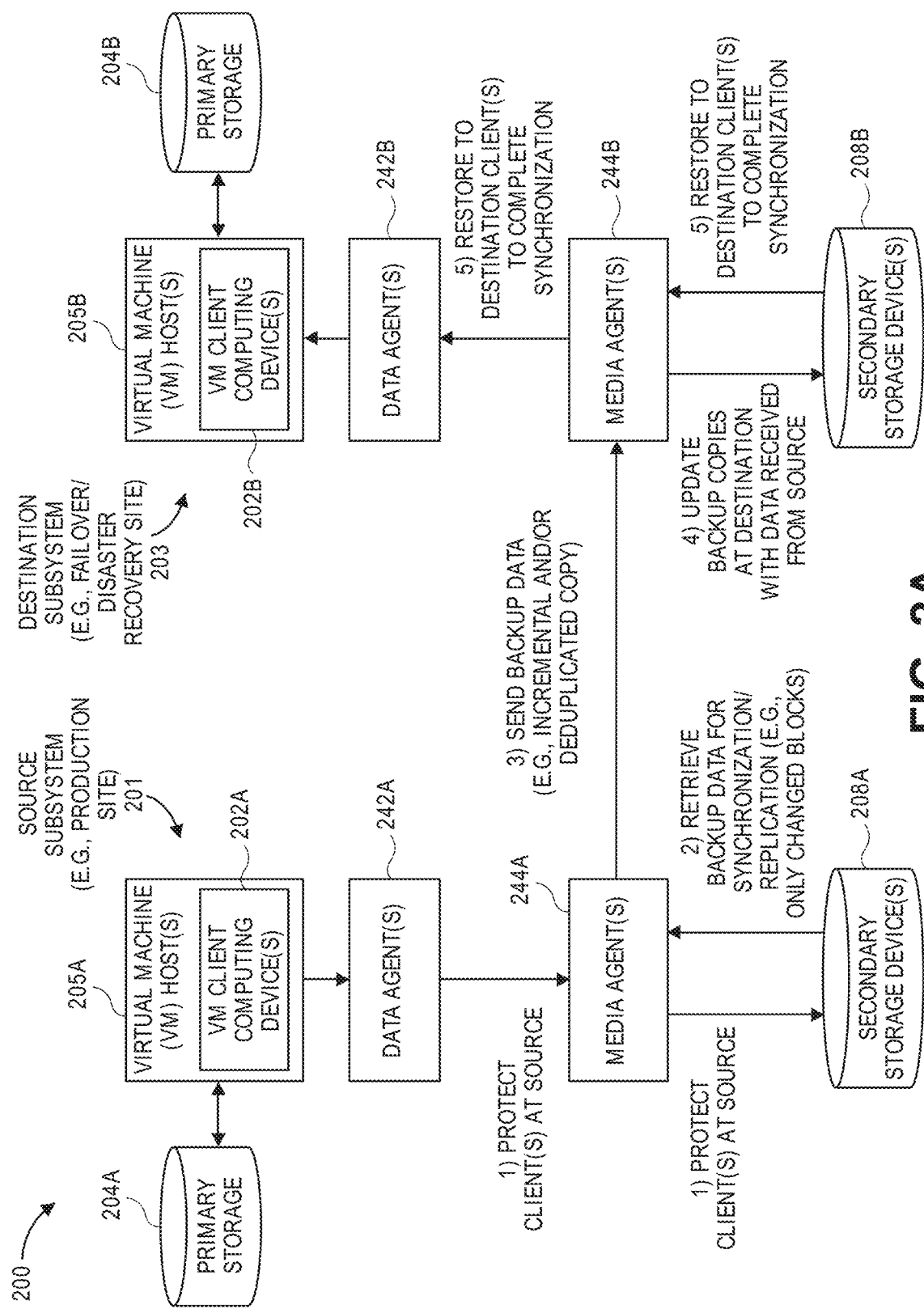
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating With the Cloud Using File System Protocols

Figure 2B:
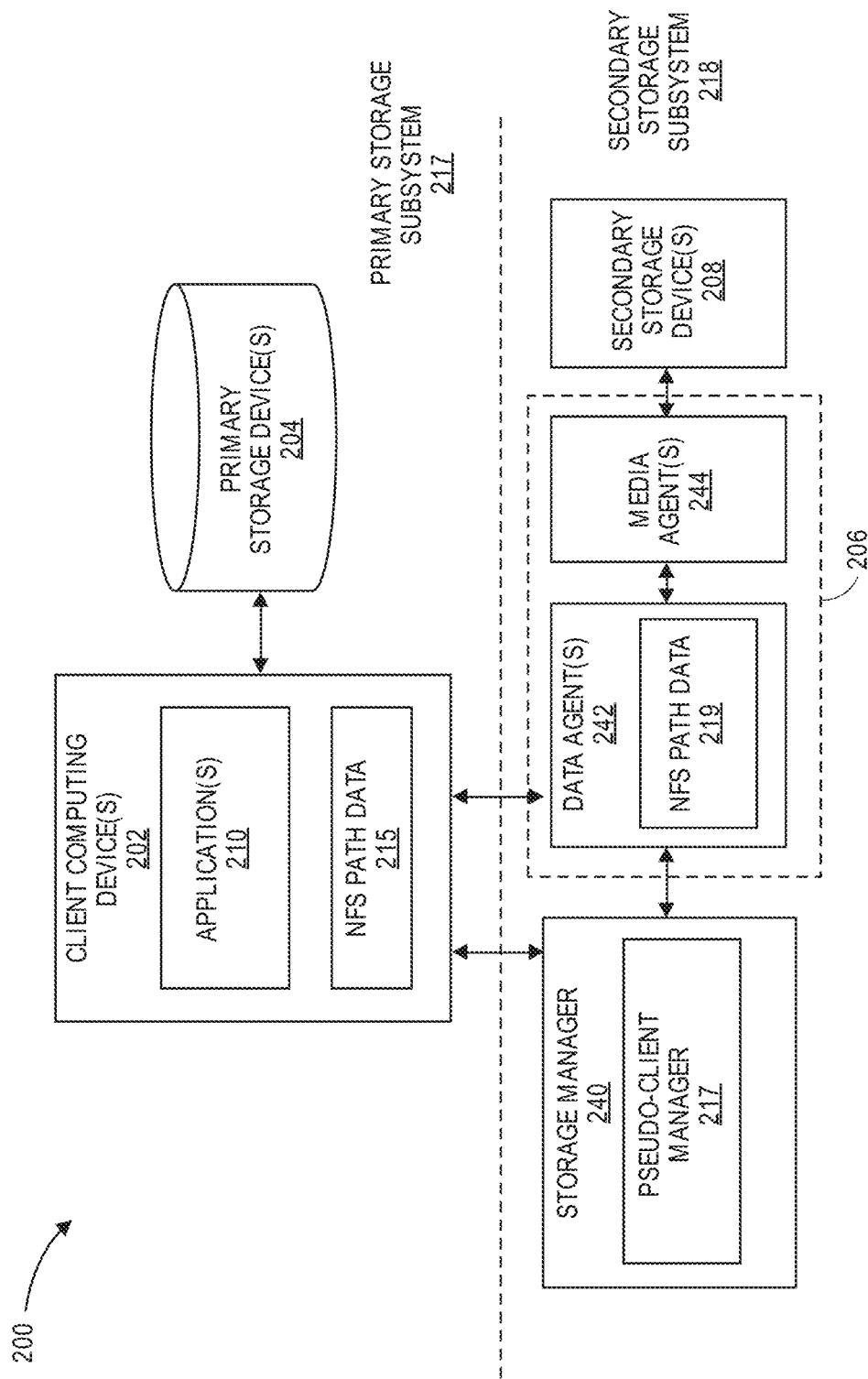
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
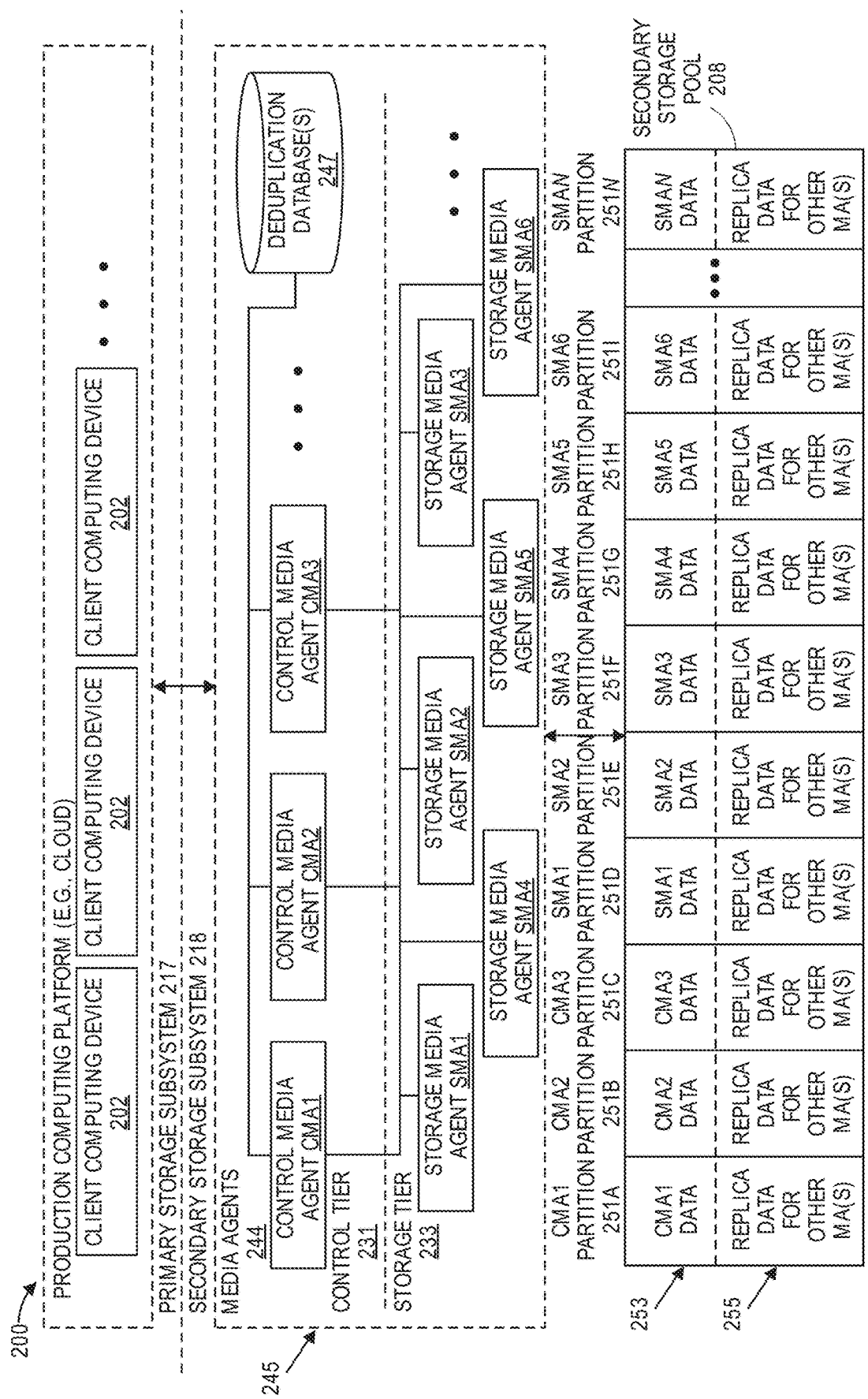
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Recovery Point Objective (RPO) Driven Backup Scheduling in a Data Storage Management System The data storage management system according to an illustrative embodiment of the present invention has been enhanced to do more than human administrators were able to do in the prior art, e.g., break out data objects that failed in a backup job and re-submit them for backup on an accelerated schedule so that the RPO can still be met; dynamically prioritize pending backup jobs so that the RPO can be met; automatically determine and implement a backup level (e.g., full, incremental, differential, synthetic full) based on RPO and backup job criteria so that the RPO can be met. Some of the salient RPO driven enhancements are outlined below with reference to the detailed descriptions in the figures.

Illustrative User Interface Enhancements. The user interface for administering backup schedules has been greatly simplified and streamlined in service to the RPO. Only two fields are provided in addition to the backup retention period, thereby simplifying what parameters need to be input by human administrators.

Backup Frequency is another way of expressing recovery point objective (RPO) herein. These two terms are used interchangeably herein.

Backup Window. The backup window specifies the intervals within days in a week where the backup job can be run, e.g., only after hours, on weekends, etc.

See also FIGS. 3-6, which depict example screenshots. The associated backup schedules section has been hidden by default for simplicity, but can be optionally displayed using an additional setting if required.

Illustrative Enhancements to Scheduling. The schedule for Full Backups has been removed. The schedule for Incremental Backups has the new option to automatically convert to Full Backup based on backup level conversion rules. The schedule for Synthetic Full Backup has been converted from weekly to automatic.

Automatic Backup Level Conversion. More details are given in FIG. 11.

Dynamic Priority Setting. In addition to the existing Operation/Client/Agent priority, Dynamic priority setting intelligently prioritizes the backup jobs based at least in part on machine learning that uses historical information to improve present operations. More details are given in FIGS. 13 and 14.

Other Illustrative Enhancements. Improvements are provided on the automatic Backup Level Conversion using agent-specific rules that are targeted to certain data agents and not others. This enhancement enables Backup Level Conversion to be triggered data agent by data agent and/or by type of data agent, rather than uniformly across the illustrative data storage management system. See also FIG. 11. Automatically resubmit backup jobs upon failure with an "aggressive" schedule to enable the subsequent backup jobs to complete within the RPO. Backup schedules are accelerated in response to detected failure(s). This enhancement substantially improves the chances of completing a backup job within the RPO. See also FIG. 14. Intelligently back up only failed items when resubmitting failed backup jobs. This enhancement, especially when coupled with the preceding item, substantially reduces the amount of backup "effort" required to complete a failed job (e.g., computing cycles, bandwidth, resources, etc.), thereby substantially improving the chances of completing a backup job within the established RPO. See also FIG. 13. Dynamic priority setting considers application size during backup. Because the size of an application and its associated data affects the duration of a backup job, taking into consideration the application size as a factor in prioritizing backup jobs substantially improves the chances of completing the application backup job within the established RPO. See also FIG. 12. Synthetic Full schedules are removed from the user interface, simplifying the administrator's tasks. See also FIGS. 3-6.

FIG. 3 depicts an illustrative screenshot showing creating an RPO-driven server backup plan, including an illustrative backup frequency and backup window. Any other type of backup target dataset is also contemplated according to the present invention, e.g., file system, laptop/mobile, virtual machines, databases, mail servers, and/or any subclient without limitation. Typically a dataset or data grouping targeted for backup protection is defined as a "subclient," which is described in more detail elsewhere herein. The depicted screenshot is merely one embodiment of an illustrative administrative screen, but the invention is not so limited.

The illustrative screenshot shows in the background a variety of RPO-driven backup plans, such as server plans, file system plans, laptop plans, e-discovery dataset plans, snapshot plans, etc. Other RPO driven backup plans (not shown) include database plans, endpoint plans, virtualization (virtual machine) plans, mail servers (e.g., Microsoft Exchange) plans, etc. A so-called "base plan" can be created and then used as a template for other so-called "derived" plans. Changes to the base plan are automatically inherited by the derived plans, thus greatly streamlining system administration.

The foreground window entitled "Create server backup plan" illustrates a few administrative parameters for a server RPO driven backup plan. Illustrative administrative fields include a plan name given by the administrator, a "storage pool" designating a storage destination for the backed up data, a retention period for the backed up data, and a backup frequency, which is a way of expressing RPO. In some embodiments, more than one secondary copy is made from a given targeted dataset; in one example, an auxiliary copy is made from the backup copy and stored to a designated "secondary storage," which in some cases is a different storage device from the storage pool device. On the example screenshot here, the "primary storage" designation for the storage pool is not to be confused with the terms "primary storage subsystem 117" and "primary storage device 104" and other references to "primary data" and "primary storage" herein. In the very limited context of the screenshots in the present figure and FIG. 4, "primary storage" defines the first or preferred storage device for the backed up data, such as a secondary storage device 108 that stores secondary copies 116. Furthermore, in the very limited context of the screenshot in the present figure, "enable secondary storage" refers to another storage device, apart from the first or preferred storage device, that is to be used for the backed up data, such as a secondary storage device 108 that stores auxiliary copies or other secondary copies.

FIG. 4 depicts an illustrative screenshot depicting an example RPO-driven backup plan for a server target, including an illustrative backup frequency and backup window. Some of the information shown in FIG. 3 is also shown here, e.g., backup frequency, backup window, storage pool designation, retention period.

In the illustrative embodiment, the backup frequency corresponds to the recovery point objective (RPO), here shown to be 4 hours, but the invention is not so limited. In some embodiments, an administrator is able to administer a backup frequency figure that is less than the RPO, but an objective of the present invention is to relieve administrators from having to work out and figure out backup frequencies; instead, it is enough to enter the RPO (expressed here illustratively as the backup frequency) and leave the actual scheduling to the components of the illustrative data storage management system, e.g., storage manager, data agent, media agent, as described in more detail in other figures herein.

The backup window defines one or more time periods in a week during which backup operations are allowed in the RPO driven schedule. Generally, the backup window defines time periods outside of normal business hours, when backups can consume computing resources with relatively low or minimal impact on production needs. The backup window is one of the administrable parameters for an RPO plan. The illustrative backup window shown here is Monday through Friday from 7 p.m. to 7 a.m. and Saturday and Sunday all day. Illustratively, a security window shows the identity of the administrator making the present RPO driven plan. Illustratively, the depicted RPO driven plan does not allow deriving to create a derived plan, but the invention is not so limited. When business hours change, the administrator can change the backup window accordingly.

In the illustrative screenshot, the retention period for the backed up data created by the illustrative RPO driven plan is 30 days, but the invention is not so limited. In general, the retention period for backed up data can be a relevant parameter in defining backup levels, i.e., whether a backup should be full, incremental, differential, or synthetic full. For example, a longer retention period might require fewer synthetic full backups, i.e., less need to synthesize a full backup copy of data, since other backup copies are retained for a longer period. Synthesizing full backups from other copies, i.e., creating a full backup comprising all the backed up, can take up a lot of storage space when the data sources are large. Thus, with longer retention periods for smaller incremental backups, it makes less sense to frequently synthesize the full backups.

This is one example of how an administrator in the prior art would have to analyze the competing parameters at issue in satisfying RPO. According to the present invention, the illustrative data storage management system has been enhanced to relieve backup administrators of these considerations. Moreover, the illustrative data storage management system has been further enhanced to do more than human administrators were able to do in the prior art, e.g., break out data objects that failed in a backup job and re-submit them for backup on an accelerated schedule so that the RPO can still be met; dynamically prioritize pending backup jobs so that the RPO can be met; automatically determine and implement a backup level (e.g., full, incremental, differential, synthetic full) based on RPO and backup job criteria so that the RPO can be met. Furthermore, these enhancements also lead to improved storage utilization.

FIG. 5 depicts detail showing backup frequency and backup window for an RPO-driven backup plan. The information shown here was also shown in FIG. 4 and is depicted here for enhanced readability.

FIG. 6 depicts an illustrative screenshot showing an editable backup window for an RPO-driven backup plan. The illustrative backup window shown here is Monday through Friday from 7 p.m. to 7 a.m. and Saturday and Sunday all day. The time of day grid shows the unavailable hours blocked out, e.g., Monday-Friday 7 a.m. to 7 p.m., thus leaving the other hours open for the backup window. Any combination of hours and days can be enabled in the backup window. Furthermore, when annual seasonality is important, time of year is added to the editable backup window. For example, if Mother's Day is a very busy time period for incoming customer orders, the backup window might be reduced or closed for that day even if it falls on a Saturday or Sunday.

The invention contemplates NO limitations on the choice of times available for the backup window. However, as explained elsewhere herein, the illustrative data storage management may in some situations determine that the backup window is insufficient to complete the pending backups in time to meet the RPO. See, e.g., FIGS. 11 and 13. In such cases, the illustrative system notifies the administrator that the RPO cannot be met and why and in some cases suggests an RPO that is achievable. It is left to the administrator to consider whether to change the RPO and/or to implement changes to the data network, storage resources, and/or storage management components (e.g., adding media agents).

FIG. 7 depicts an example enhanced storage manager 740 for RPO-driven backup scheduling. The present figure depicts certain functional components of storage manager 740, including: schedule management agent 754 comprising RPO driven schedule management logic 755; jobs agent 756 comprising RPO driven jobs logic 757; user interface agent 758 comprising RPO driven user interface logic 759; and management database 746 comprising RPO parameters 747 and RPO results 748.

Storage manager 740 is analogous to storage manager 140 and additionally comprises enhancements for RPO driven backup scheduling, management, and status-keeping. Storage manager 740 executes on a suitable computing device that comprises one or more computer processors and computer memory for processing computer programs. Illustratively, storage manager 740 executes on a dedicated server, though the invention is not so limited. Storage manager 740 manages the illustrative data storage management system as a whole, including managing storage operations, including backup jobs.

Management database 746 is analogous to management database 146 and additionally comprises data for performing, managing, and tracking RPO based scheduling, such as RPO parameters 747 and RPO results 748, without limitation. As with management database 146, management database 746 is associated with and is a logical component of storage manager 740 but does not necessarily reside on the same computing device that hosts storage manager 740.

RPO parameters 747, which are administered into the system by an administrator or other user, comprise: RPO objective expressed as backup frequency; backup window; and retention period. These are discussed in more detail in regard to other figures. In some embodiments, there is only one set of RPO parameters 747 that apply to all target datasets in the system. In other embodiments, there are several sets of RPO parameters 747, embodied as distinct RPO driven backup plans, e.g., server backup plan; virtualization backup plan, etc., each set applicable to distinct target datasets (e.g., subclients, clients) as discussed in more detail in regard to FIG. 3. Thus, a given set of RPO parameters as applied to a certain target dataset (e.g., subclient, client) is sometimes referred to herein as an "RPO driven backup plan." In some embodiments, some backup plans are not RPO driven. The invention contemplates the co-existence of RPO driven plans with non-RPO backup plans for different subclients. As used in the present application, RPO parameters 747 are administered. Other parameters for properly defining, managing, executing, and gathering status from RPO driven backup jobs are automatically determined by the illustrative components described herein, e.g., storage manager 740, data agent 842, media agent 844, and are not administrable in an illustrative RPO driven plan. These other parameters, e.g., storage policies, start times, accelerated schedules, etc. are stored in management database 746 in any format suitable to the database, without limitation. Likewise, RPO parameters 747 are stored in management database 746 in any format suitable to the database, without limitation.

RPO results 748 comprise information gathered by the illustrative data storage management system from RPO driven backup jobs, i.e., backup jobs executed from an RPO driven backup plan. These results are gathered from one or more storage management components involved in the respective backup job, e.g., data agent 842, media agent 844, and/or storage manager 740. RPO results 748 are stored in management database 746 in any format suitable to the database, without limitation. Examples of results 748 include job completion status, job start and completion times; data object count backed up in a job; data objects that failed in a backup job, re-submit information, etc., without limitation.

Schedule management agent 754 is a functional logic component of storage manager 740, analogous to management agent 154 and enhanced with functionality for RPO driven backup scheduling and management, e.g., RPO driven schedule management logic 755.

RPO driven schedule management logic 755, in some embodiments, analyzes RPO parameters administered for a given RPO driven backup plan and generates a storage policy for the targeted dataset (e.g., client, subclient), including a suitable start time for each backup job within the backup window. Illustratively, automatic backup level determination also is performed here, though in alternative embodiments RPO driven jobs logic 757 performs this functionality. Illustratively, failed data objects are assembled into a new job for re-submission in order to meet the RPO. Machine learning is used here for analyzing historical performance data and job size in order to determine a proper backup level, estimated job completion time, etc. See also FIG. 12.

Jobs agent 756 is a functional logic component of storage manager 740, analogous to jobs agent 156 and enhanced with functionality for RPO driven backup scheduling and management, e.g., RPO driven jobs logic 757.

RPO driven jobs logic 757, in some embodiments, analyzes pending jobs for strike counts and estimated job completion times, and establishes a priority order for pending jobs within the backup window. Illustratively, dynamic priority setting and re-setting also is performed here, e.g., when a backup job fails in whole or in part. Machine learning is used here for analyzing historical performance data and job size in order to analyze job failure history, estimate job completion time, etc. See also FIG. 12.

User interface agent 758 is a functional logic component of storage manager 740, analogous to user interface agent 158 and enhanced with functionality for administering RPO driven backup plans, e.g., RPO driven user interface logic 759.

RPO driven user interface logic 759, which is illustratively depicted in some of the earlier figures herein, enables an administrator of the illustrative data storage management system to enter RPO parameters for creating RPO driven backup plans. See also FIGS. 3-6.

Functional agents 754, 756, and 758 are depicted here as separate functional units to ease the reader's understanding of the present disclosure, but the invention is not so limited. In alternative embodiments, these units are combined within the logic of storage manager 740, in whole or in part, without limitation, and the functionality described above in regard to each individual unit is generally performed by and within storage manager 740. Likewise, logic components 755, 757, and 759 are depicted here as separate functional units to ease the reader's understanding of the present disclosure, but the invention is not so limited. In alternative embodiments, these logic components are combined within the logic of storage manager 740, in whole or in part, without limitation, and the functionality described above in regard to each one is generally performed by and within storage manager 740. See also FIG. 9.

FIG. 8 depicts an illustrative enhanced data agent 842 and enhanced media agent 844 in communication with each other and with enhanced storage manager 740 for RPO-driven backup scheduling in a data storage management system 800. FIG. 8 depicts a "skeleton crew" of storage management components (e.g., 740, 842, 844) for an illustrative data storage management system 800 according to an embodiment of the present invention. FIG. 8 depicts: storage manager 740; data agent 842 comprising RPO driven data agent logic 843; and media agent 844 comprising RPO driven media agent logic 845, and media agent database 852 comprising RPO results 853. Communication pathways 114 between the depicted components are described in more detail elsewhere herein.

Data storage management system 800 is analogous to system 100 and according to an embodiment of the present invention comprises a storage manager 740, one or more data agents 742, and one or more media agents 844, without limitation. Data storage devices that store primary data and/or secondary copies (e.g., backup copies) (e.g., 104, 108) also are part of and/or associated with the data storage management system, as depicted in FIGS. 1A and 1C. Client computing devices (e.g., 102) that host applications and file systems being protected also are part of and/or associated with the data storage management system, as depicted in FIGS. 1A and 1C.

Enhanced data agent 842 is analogous to data agent 142 and additionally comprises functionality for RPO driven backup scheduling, e.g., logic 843. Data agent 842 executes on a computing device (e.g., 102—not shown in the present figure), which comprises one or more computer processors and computer memory for executing computer programs. In some embodiments, computing device 102 hosts both data agent 842 and its target application/file system 110, as shown in FIG. 1C. In other embodiments, such as virtualized environments, data agent 842 executes on a VM server or a VM controller and not in the individual VMs being protected by the data agent.

RPO driven data agent logic 843 is a functional component of data agent 842, which perform RPO-related functionality, such as identifying individual data objects within a target dataset (e.g., client, subclient) to be backed up, tracking whether the individual data object was successfully backed up, and reporting accordingly to storage manager 740. The identifying is based on a level of granularity. Data objects that failed to be backed up are individually reported to storage manager 740 for re-submission to later backup jobs. In some embodiments, logic 843 processes a granularity indication received from storage manager 740, which indicates what level of granularity is to be tracked in the RPO driven backup jobs for the target dataset (e.g., client, subclient). For example, in the case of a mail server data agent 842, granularity can be defined at the server level, at the mailbox level, at the message level, and/or at the attachment level distinct from the message. Based on the granularity, data agent 842, e.g., using logic 843, analyzes its target dataset and is able to identify individual data objects as instructed by storage manager 740, and furthermore is able to track the backup success/failure of the individual data objects. RPO driven data agent logic 843 is shown here as a distinct functional component to ease the reader's understanding of the present disclosure, however, alternative embodiments are also possible within the scope of the present invention. In some embodiments logic 843 is layered on existing data agent code, or is distributed throughout data agent software, and/or in any combination and without limitation. See also FIG. 15.

Enhanced media agent 844 is analogous to media agent 144 and additionally comprises functionality for RPO driven backup scheduling, e.g., logic 845, and RPO results 853. Media agent 844 executes on a computing device (e.g., 206—not shown in the present figure), which comprises one or more computer processors and computer memory for executing computer programs. See, e.g., FIG. 1C.

RPO driven media agent logic 845 is a functional component of media agent 844, which performs RPO-related functionality, such as identifying individual data objects being saved to a backup copy and tracking whether the individual data object was successfully stored to backup media, and reporting accordingly to storage manager 740 and/or to data agent 842. Data objects that failed to be backed up are individually reported. See also FIG. 15.

RPO driven media agent logic 845 is shown here as a distinct functional component to ease the reader's understanding of the present disclosure, however, alternative embodiments are also possible within the scope of the present invention. In some embodiments logic 845 is layered on existing media agent code, or is distributed throughout media agent software, and/or in any combination and without limitation.

Results are stored to RPO results 853. Data objects that were successfully backed up in an RPO driven backup job are indexed in media agent database 852, e.g., in RPO results 853 and/or in index 153. Data objects that failed to be backed up are individually reported and status stored to RPO results 853. In some embodiments, RPO results 853 are part of index 153. Results 853 are reported in whole or in part to storage manager 740 and/or data agent 842 at the end of a backup job; and/or on demand in response to queries therefrom. See also FIG. 15.

Not shown in this figure are the data sources 110/112 for RPO driven backup jobs or the storage destinations 108 for backup copies 116 resulting from the RPO driven backup jobs. These can be found elsewhere, e.g., FIGS. 1A-1C and 2A-2C.

FIG. 9 depicts a flow chart of an illustrative method 900 according to an illustrative embodiment of the present invention. In general, unless otherwise noted, the operations in method 900 are performed by storage manager 740, e.g., using one or more of agents 754, 756, and/or 758 and management database 746, alone or in any combination and without limitation.

At block 902, storage manager 740 receives administrative parameters, for an RPO-driven backup plan for a given target dataset, e.g., client, subclient. More details are given in another figure herein.

At block 904, storage manager 740 determines a suitable backup level for the target dataset. The backup level determination is based on several factors as discussed in more detail in another figure herein.

At block 906, storage manager 740 determines a start time for an RPO driven backup job sufficient to meet RPO timeframe for the target dataset. It is contemplated that the start time is devised such that it accounts for a pattern of past backup failures and yet allows for more backup failures and enough time to re-submit failed data objects for backup such that the RPO can still be met. More details are given in another figure herein.

At block 908, storage manager 740 starts the RPO driven backup job at the start time. During the initial attempt, the start time is determined at block 906. When a given RPO driven backup job fully completes within the RPO timeframe, the RPO clock is reset and control passes back to block 904 for handling the next RPO driven backup job for the present target dataset, e.g., client, subclient.

However, on detecting failures in the backup job as scheduled, the illustrative storage manager 740 is configured to re-submit those data objects that failed on an accelerated schedule so that all data objects can be backed up within the RPO timeframe. Thus, subsequent backup jobs involve only the subset of data objects that failed in preceding attempt(s). Failed backups are addressed in the next block.

At block 910, storage manager 740 analyzes failed backup jobs and initiates remedial action(s) using dynamic priority setting and accelerated re-submission of failed data objects. At any given time, several failed backup jobs might be pending, e.g., from diverse target datasets, and storage manager 740 needs to analyze and address them. Control passes back to block 908 for starting one or more re-submitted backup jobs. More details are given in another figure herein.

Figure 10:
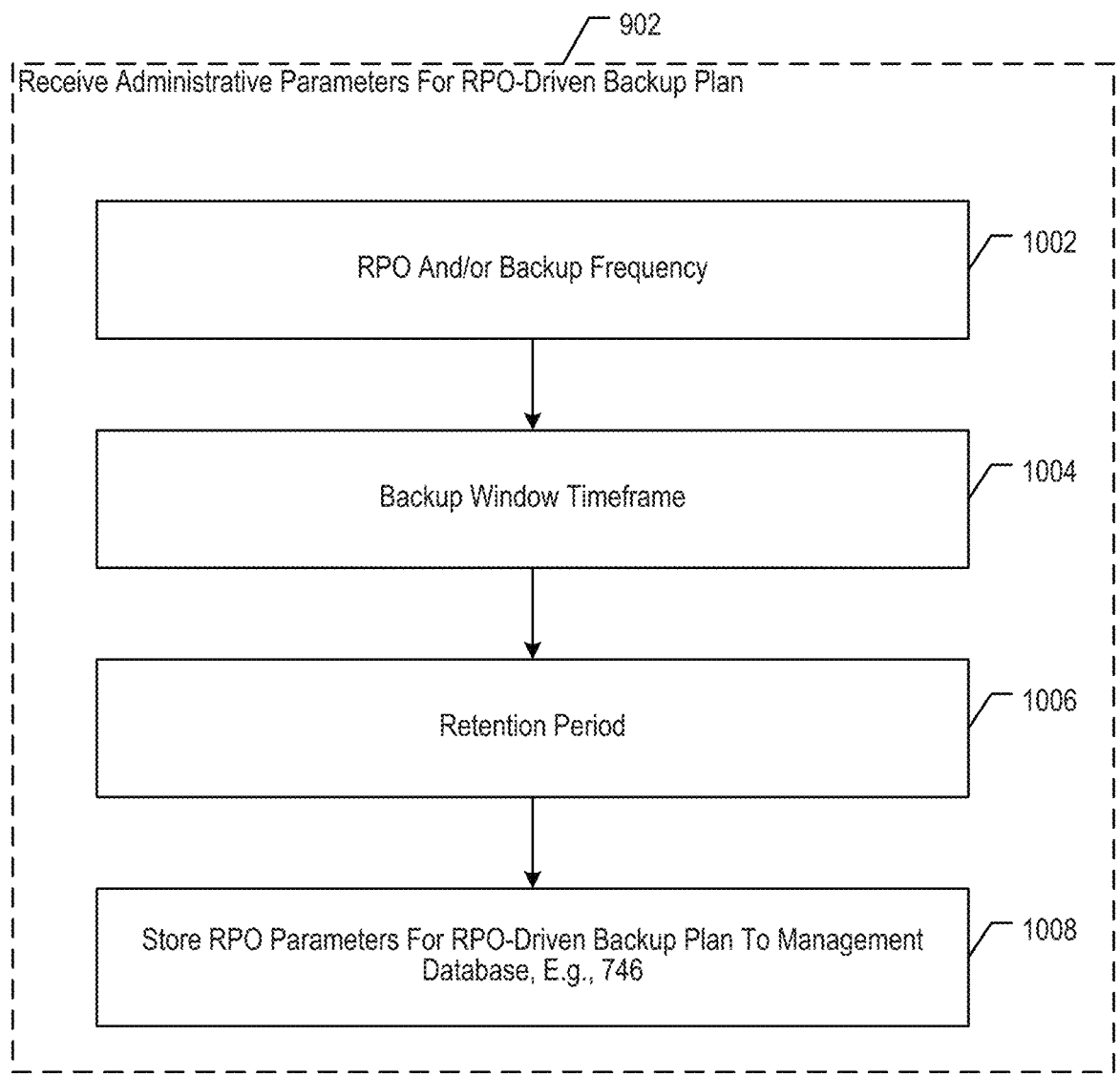
FIG. 10 depicts a flow chart of an illustrative block 902 in method 900.

FIG. 10 depicts a flow chart of an illustrative block 902 in method 900. In general block 902 is directed at storage manager 740 receiving administrative parameters for an RPO-driven backup plan. Administration is performed though user interface agent 758, illustratively using administrative screens as shown in FIGS. 3-6. RPO parameters 747 include RPO expressed as backup frequency, backup window, and retention interval as noted elsewhere herein. See also FIGS. 3-7. As noted, in some embodiments RPO and a set of RPO parameters 747 are defined globally. Because some data is often considered to be more important than other data, it is customary to define RPO parameters for distinct target datasets, e.g., per subclient. For simplicity and ease of understanding, we shall refer herein to RPO and an associated target dataset, e.g., client, subclient, in the singular, even when multiple RPOs are configured within a single data storage management system.

At block 1002, storage manager 740 receives the RPO and/or the backup frequency. In some embodiments the backup frequency is synonymous with the RPO. In other embodiments, the RPO is administered separately from the backup frequency, and the backup frequency figure is less than or equal to the RPO. An example RPO for a busy transaction database is 1 minute or less, even as little as 15 seconds. An example RPO for user-generated data at desktop/laptop computers is 4 hours. There is no limitation on the RPO and/or backup frequency values.

At block 1004, storage manager 740 receives a backup window timeframe. See, e.g., FIG. 6. An example backup window timeframe is 7 p.m. to 7 a.m. on weekdays and all day Saturday and Sunday. There is no limitation on the RPO and/or backup frequency values, though as noted, they may be unsuitable to the amount and kind of data being backed up.

At block 1006, storage manager 740 receives a retention period applicable to the backup copies generated in the RPO driven backup job for the target dataset, e.g., client, subclient. An example retention period is 30 days. There is no limitation on what the length of the retention period is.

Figure 11:
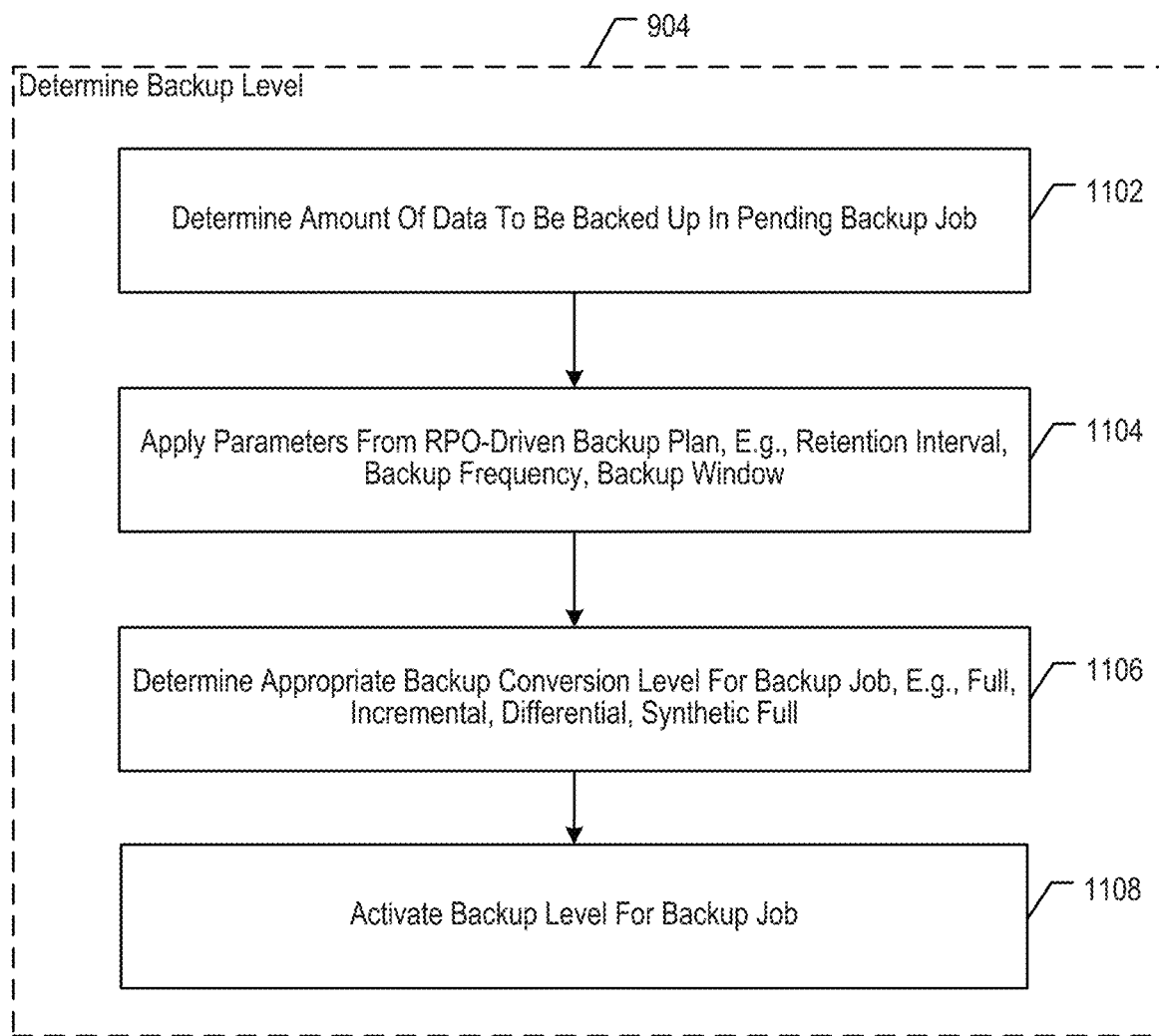
FIG. 11 depicts a flow chart of an illustrative block 904 in method 900.

At block 1008, storage manager 740 stores the administered RPO parameters for the RPO-driven backup plan to a management database, e.g., 746. See also FIG. 7. In general, management database 746 stores administrative parameters of all kinds, including the RPO parameters for the one or more RPO driven backup plans in the illustrative data storage management system. Management database 746 also stores additional parameters for PRO driven backup plans that are not expressly administered by an administrator FIG. 11 depicts a flow chart of an illustrative block 904 in method 900. Block 904 is generally directed at the storage manager 740 determining a backup level based on RPO parameters At block 1102, storage manager 740 tentatively determines a minimum amount of data to be backed up in the next pending backup job. Illustratively, storage manager 740 queries data agent 842 for this information. At this stage, storage manager 740 receives from a data agent 842 that is responsible for protecting the targeted dataset (e.g., client, subclient) an amount that quantifies how much data has changed since a preceding backup. However, the amount of changed data may not be what actually gets backed up in the pending backup job. An actual amount of data depends on the backup level, e.g., full, incremental, etc., which may be greater than just the changed data.

At block 1104, storage manager 740 applies one or more parameters from an RPO-driven backup plan that governs the target dataset (e.g., client, subclient). The RPO parameters that are applied here include one or more of: retention interval, backup frequency, and/or backup window. These parameters are retrieved by storage manager 740 from management database 746.

At block 1106, storage manager 740 determines an appropriate backup level for the pending backup job, e.g., full, incremental, differential, synthetic full. In contrast to the prior art, where the backup level is expressly administered and changes only when re-administered by an administrator, the illustrative embodiment is configured to determine an appropriate backup level for existing customer without further input from users/administrators.

According to an illustrative embodiment:
The schedule for Full Backups has been removed;
The schedule for Incremental Backups has the new option to automatically convert to Full Backup based on backup level conversion rules; and
The schedule for Synthetic Full Backup has been converted from weekly to automatic.

"Automatic Backup Level Conversion" refers to servicing an existing target dataset (e.g., client, subclient) that was previously administered with certain parameters for full, incremental, differential, and/or synthetic full backups. The previously administered backups are now "converted" according to one or more of the following applicable rules. Because the Full Backup schedule is now removed according to the illustrative embodiment, the jobs from the Incremental Backup schedule are automatically converted to Full Backups illustratively as follows:

For SQL database and other database data agents:
If the last Full Backup is older than the Retention Period (e.g., 30 days) and the Operation Window allows Full Backups, the backup job is converted to Full Backup.
If the last Full Backup is within the Retention period (e.g., 30 days) and the last Differential Backup is older than 7 days, the backup job is converted to Differential.
The invention is not limited to the illustrative 30-day and 7-day periods.

For other data agents:
If the last Full Backup is older than the Retention Period (e.g., 30 days) and the Operation Window allows Full Backups, the backup job is converted to Full Backup.
The invention is not limited to the illustrative 30-day period.

Synthetic Full backups consolidate data from the latest full backup or synthetic full backup and any subsequent incremental and/or differential backups into one archive file, instead of reading and backing up data directly from the client computer. However, Synthetic Full backups are not recommended for target datasets that are relatively large and have relatively long retention periods, e.g., a database with a 1-year retention period. In such an example, frequently (e.g., daily or weekly) running a Synthetic Full backup would generate many full backup copies the size of the database, which collectively would occupy a large amount of storage space over the course of the 1-year retention period. Moreover, running the Synthetic Full backup would entail a substantial amount of compute time for such a large dataset, which may strain the backup window. Thus, continuing the present example, a 1 TB database for which a Synthetic Full is created daily would occupy at least 365×1 TB=365 TB of storage space that might be more economically used by simply retaining the incremental backup copies. In some scenarios, when the rate of change of data within a target dataset is relatively low, i.e., few changes relative to a large body of data, making frequent Full Backups also can be less than optimal, because simply retaining a plurality of relatively small incremental backups occupies less space and chews up fewer processing resources. These are illustrative considerations and the invention is not so limited.

At block 1108, storage manager 740, having determined a suitable backup level for the pending backup job, activates the backup level. In some embodiments, storage manager 740 creates a storage policy, which is stored to management database 746 and comprises the backup rules for the pending backup job, including identifying the target dataset (e.g., client, subclient) and the backup level for the next backup job. A start time for the backup job is determined elsewhere herein (see, e.g., FIG. 12).

Figure 12:
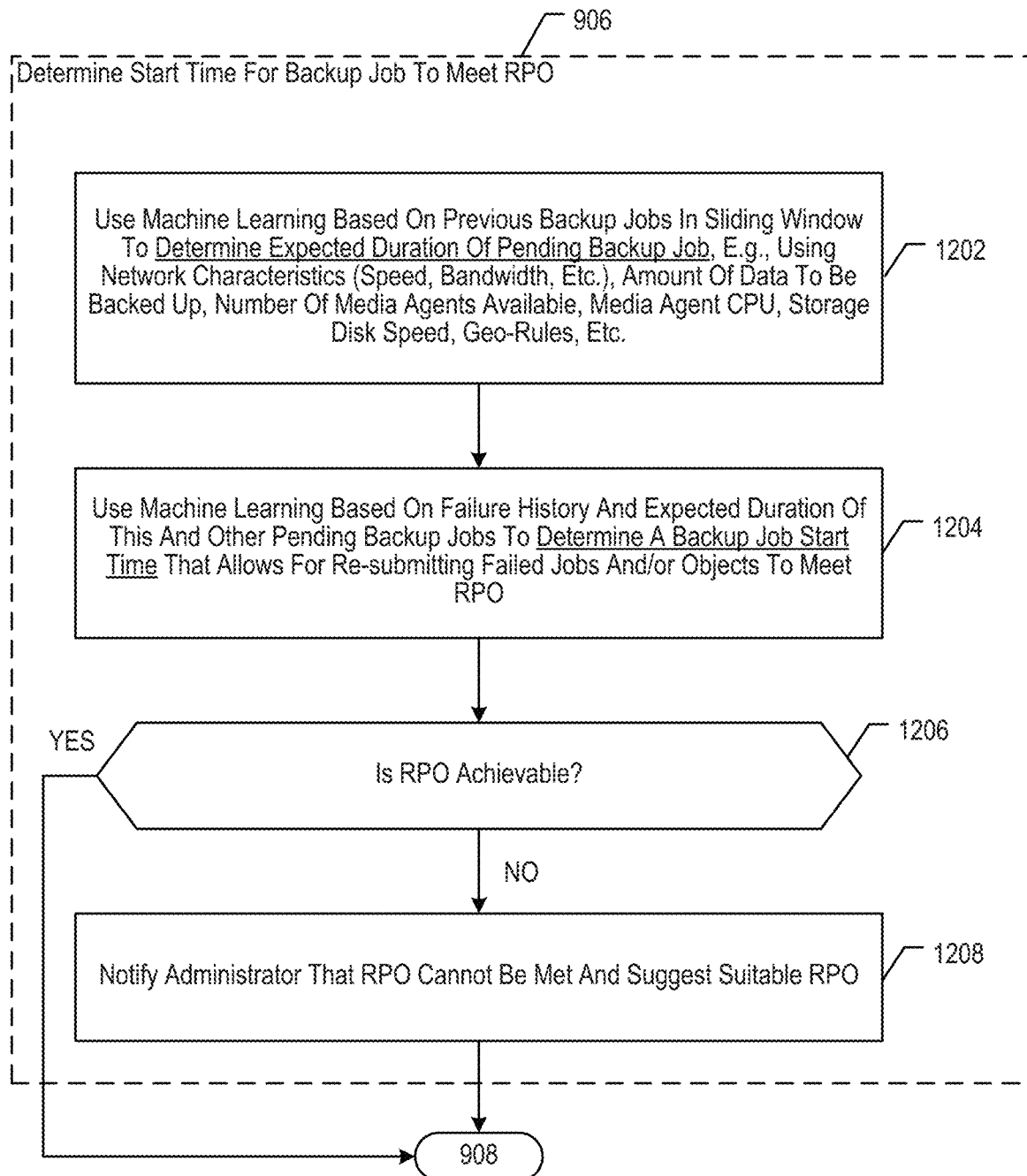
FIG. 12 depicts a flow chart of an illustrative block 906 in method 900.

FIG. 12 depicts a flow chart of an illustrative block 906 in method 900. Block 906 is generally directed at storage manager 740 determining a start time for the pending backup job sufficient to meet the RPO.

At block 1202, storage manager 740 determines an expected duration of the pending backup job. Storage manager 740 illustratively uses machine learning based on a sliding window of past backup jobs to make the expected duration determination. An illustrative sliding window is three months, though the invention is not so limited and any sliding window can be defined as the basis for machine learning here. Attributes that are considered in analyzing the past backup jobs to determine the expected duration for the pending backup job include one or more of the following without limitation:
network characteristics (data speed, bandwidth, etc.);
amount of data to be backed up (see, e.g., FIG. 11), including application size;
media agent CPU(s) capacity;
number of media agents (e.g., 844, 144) available for processing the backup copy and storing it to storage device(s) 108;
storage disk speed(s) on the destination storage device(s) 108 that are to receive the backup copy;

geographic rules for choosing the media agent(s), such as proximity to the target dataset being backed up, restrictions on data exports across country boundaries, time zones affecting backup window suitability (e.g., business hours in another time zone);

and/or in any combination without limitation.

Although machine learning techniques are known in the art, the application of machine learning to analyzing backup operations in a data storage management system as described herein, including the use of one or more of the attributes shown above, was devised by the present inventors to generate an expected duration for the pending backup job. One or more of the attributes above is used in the machine learning determination to generate an expected duration for the pending backup job. This figure is important in determining when to kick off the backup job, and further in prioritizing all the pending backup jobs within the available backup window, and ultimately leading to a determination on whether the RPO can be met under existing conditions.

At block 1204, storage manager 740 determines a start time for the pending backup job. Implied herein is a prioritization and ordering of all pending backup jobs within the available backup window. In other words, all backup jobs pending for the backup window need to be considered, prioritized, ordered, and given a respective start time so that all pending jobs can be completed in time to meet the RPO, including leaving enough time for re-submissions of failed data objects. When prioritizing the pending backup jobs, the applicable rules include without limitation:

A job with a longer expected duration is given an earlier start time than a job with a shorter expected duration.

When two pending jobs have equal or substantially equal expected durations, the job with a higher expectation of failure (e.g., more expected failed data objects based on past failure history) is given an earlier start time than a job with a lower expectation of failure.

These rules are generally consistent with the rules for remedial action applied after a job fails in whole or in part, though the invention is not so limited. See, e.g., FIG. 14.

Storage manager 740 illustratively uses machine learning based on a sliding window of past backup jobs to make the start time determination such that it allows for re-submitting failed jobs and/or data objects. The objective here is to arrange the pending jobs so that the RPO can be met, though as discussed below, the RPO may be over-constrained and not achievable. An illustrative sliding window is three months, though the invention is not so limited and any sliding window can be defined as the basis for machine learning here. Attributes that are considered in analyzing the past backup jobs to determine the start time for the pending backup job include one or more of the following without limitation:

expected duration of pending backup job (see preceding block);

past history of backup failures for the target dataset, e.g., failed job, failed data objects;

administered backup window;

RPO and/or backup frequency;

expected duration and respective failure histories of other pending backup jobs for the backup window—the pendency of other pending backup jobs affects the determination of when the present backup job should start;

and/or in any combination without limitation.

Although machine learning techniques are known in the art, the application of machine learning to analyzing backup operations in a data storage management system as described herein, including the use of one or more of the attributes shown above, was devised by the present inventors to determine a start time for pending backup jobs within the available backup window. One or more of the attributes above is used in the machine learning determination to generate a start time for the pending backup job. This figure is important in ultimately leading to a determination on whether the RPO can be met under existing conditions. The start time for the present pending backup job is assigned in the context of the other backup jobs that are also pending. A start time for every one of the pending backup jobs assigned to the backup window is determined before proceeding to block 1206.

At block 1206, which is a decision point, storage manager 740 determines whether the administered RPO is achievable. To determine whether the RPO is indeed achievable, storage manager 740 needs to determine whether all pending backup jobs can be completed within the available backup window. Based on the analyses in blocks 1202 and 1204, storage manager has determined an estimated completion time for and has assigned a start time to each pending backup job to be executed during the available backup window. However, the conditions available for these jobs may be over-constrained and storage manager 740 may determine that the RPO is not achievable. For example, the jobs may need more time to complete than the backup window allows. For example, the expected completion time, included expected failures and re-submissions based on job history may indicate that the backup window cannot be met. For example, the completion time of a given backup job as compared to its predecessor job exceeds the RPO even if it meets the backup window. These scenarios can happen when too many backup jobs compete for the same backup window, or when network/system conditions simply do not allow for timely and/or reliable job execution.

When storage manager determines that the RPO cannot be met by one or more pending backup jobs, control passes to block 1208 for notifying system administrators. If the RPO is achievable, control passes to block 908.

At block 1208, storage manager 740 notifies administrator(s) that the RPO cannot be met collectively by all the pending backup jobs and specifically by certain backup jobs, as determined at block 1206. Furthermore, a more achievable RPO that is suitable to present conditions is suggested for administrator(s) to consider. Administrator(s) can take responsive actions, such as adjusting the administered RPO for one or more target datasets, adjusting the backup window, implementing improvements to the data network, and/or adding storage management resources such as media agents and/or adding/upgrading data storage devices. Control passes to block 908 for executing the backup jobs according to the established start times. When a backup job fails in whole or in part at block 908, control passes to block 910, which is described in more detail in FIG. 13.

Figure 13:
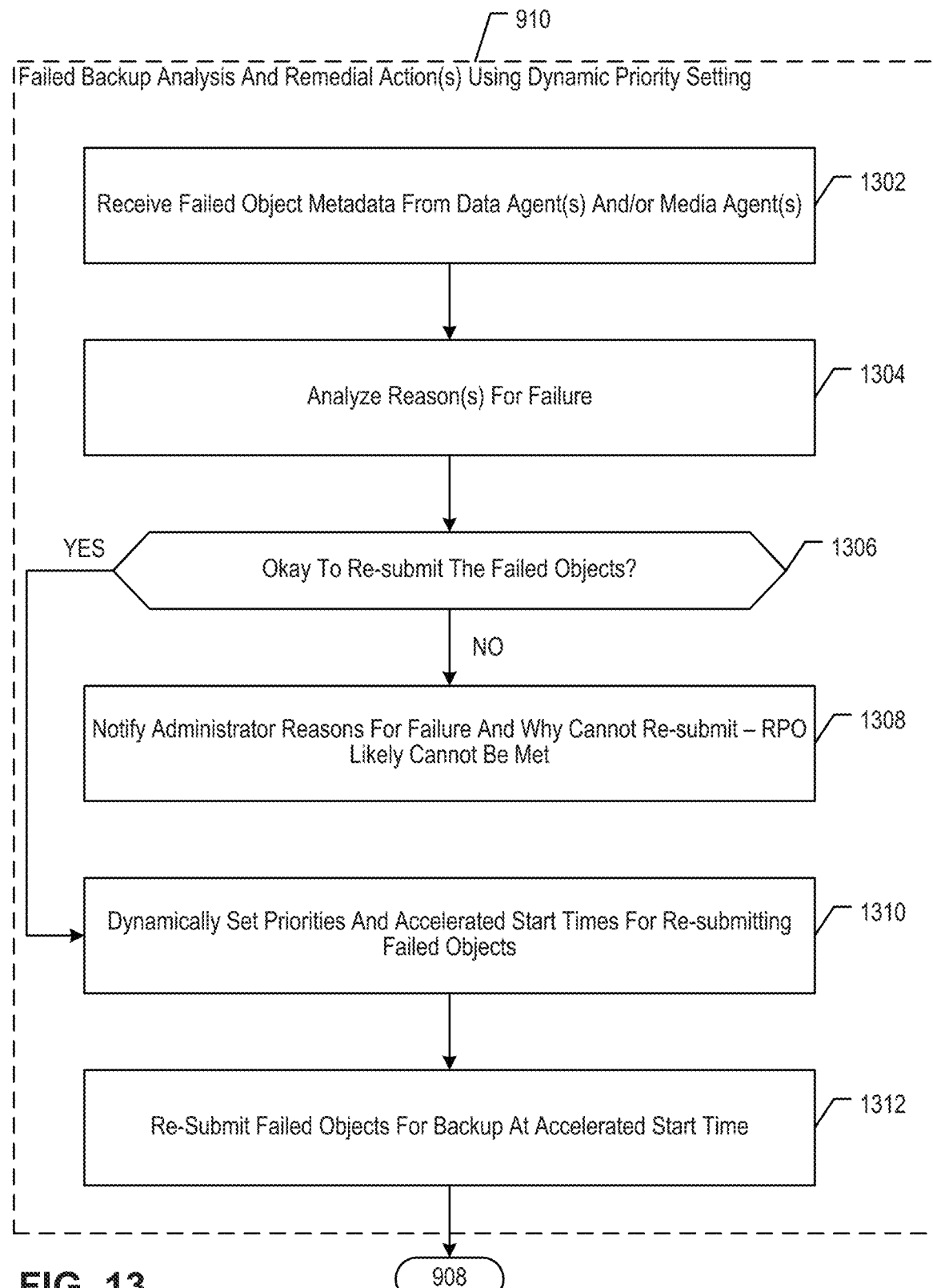
FIG. 13 depicts a flow chart of an illustrative block 910 in method 900.

FIG. 13 depicts a flow chart of an illustrative block 910 in method 900. In general, block 910 is directed at storage manager 740 analyzing failed backup jobs and taking remedial action(s) using dynamic priority setting.

At block 1302, storage manager 740 receives failed object metadata from data agent(s) 842 and/or media agent(s) 844 that are involved in the present backup job(s). The metadata identifies one or more data objects in the target dataset (e.g., client, subclient) that were supposed to be backed up in the present job but their backup operation(s) failed, and therefore the data objects are referred to as "failed data objects."

In addition to identifying the failed data objects, the metadata in some embodiments also includes other information about the reasons for failure and/or information about network and/or component conditions, e.g., failed network connection, full data storage device, etc. More details are given in FIG. 15.

At block 1304, storage manager 740 analyzes reason(s) why a backup job failed in whole or in part. To perform the analysis, storage manager 740 uses information received from data agent(s) 842 and/or media agent(s) 844 in the preceding block, and further uses other information available to storage manager 740 such as responses to queries posed by storage manager 740 to other components, e.g., data agents, media agents, routers, gateways, storage devices, etc. Storage manager 740 is configured to interpret information it receives and to draw conclusions about:

The identities of failed data objects;

The amount of data that failed backup;

The failure condition(s) associated with every element of the data pathway involved in the backup job, e.g., computing device hosting the data agent, application status, storage device storing the source data to be backed up, computing device(s) hosting the media agent(s), storage device(s) for storing the backed up data, and network facilities connecting the components.

At block 1306, which is a decision point, storage manager 740 determines whether it is okay to re-submit the failed data objects for backup in another backup job. Based on its analysis and inferences in the preceding block, storage manager 740 determines whether a given element is temporarily unavailable, and therefore suitable for a re-try or whether the reasons for failure are such that re-submission would be futile. For example, a failed data object would not be re-submitted for backup when:

Destination data storage device 108 has run out of or has insufficient storage space to accommodate the failed data object;

Media agent 844 and/or computing device 206 hosting the media agent is not working, e.g., crashed, power failure, out of service, etc.;

A re-try limit has been reached and further re-submissions are contraindicated;

Certain hardware component(s) had a catastrophic failure;

Etc., without limitation.

When storage manager 740 determines that a re-submission or re-try should not be attempted, control passes to block 1308.

In contrast, a failed data object would be re-submitted for backup when:

The source application had a locked file, table, etc., which is likely to be unlocked later on, thus making the data object accessible for backup on re-try;

Power failure at the destination data center, which might be temporary and resolved by the time the failed objects are re-submitted; a re-try limit may be established here;

An alternative media agent exists that can store backup data to the destination storage device;

Limited bandwidth prevented the first backup job to complete, but the failed data objects could be backed up on re-try;

Other network conditions, e.g., bottlenecks, glitches, etc., could be temporary and resolved by the time the failed objects are re-submitted; a re-try limit may be established here;

Etc., without limitation.

When storage manager 740 determines that a re-submission or re-try should be attempted, control passes to block 1310, where some adjustments will be dynamically implemented.

At block 1308, storage manager 740 notifies the administrator of the failed data objects and their respective reasons for failure and why re-submitting these failed data objects for backup should not be attempted further within the present backup window. This likely means that the RPO cannot be met. The notification to the administrator can take any suitable form, e.g., email, alarm, etc. The administrator would then be responsible for rectifying the situations that are causing the backup failures, such as provisioning additional storage space/devices, restoring power, repairing/upgrading failed components, etc. See also block 1208.

At block 1310, storage manager 740 dynamically sets priorities and accelerated start times for re-submitting failed data objects for backup in an attempt to get the failed data objects backed up in time to meet the RPO. More details regarding block 1310 are given in a subsequent figure.

At block 1312, storage manager 740 re-submits failed data objects for backup at an accelerated start time in an attempt to get the failed data objects backed up in time to meet the RPO, the start time and prioritized ordering having been established at block 1310.

Figure 14:
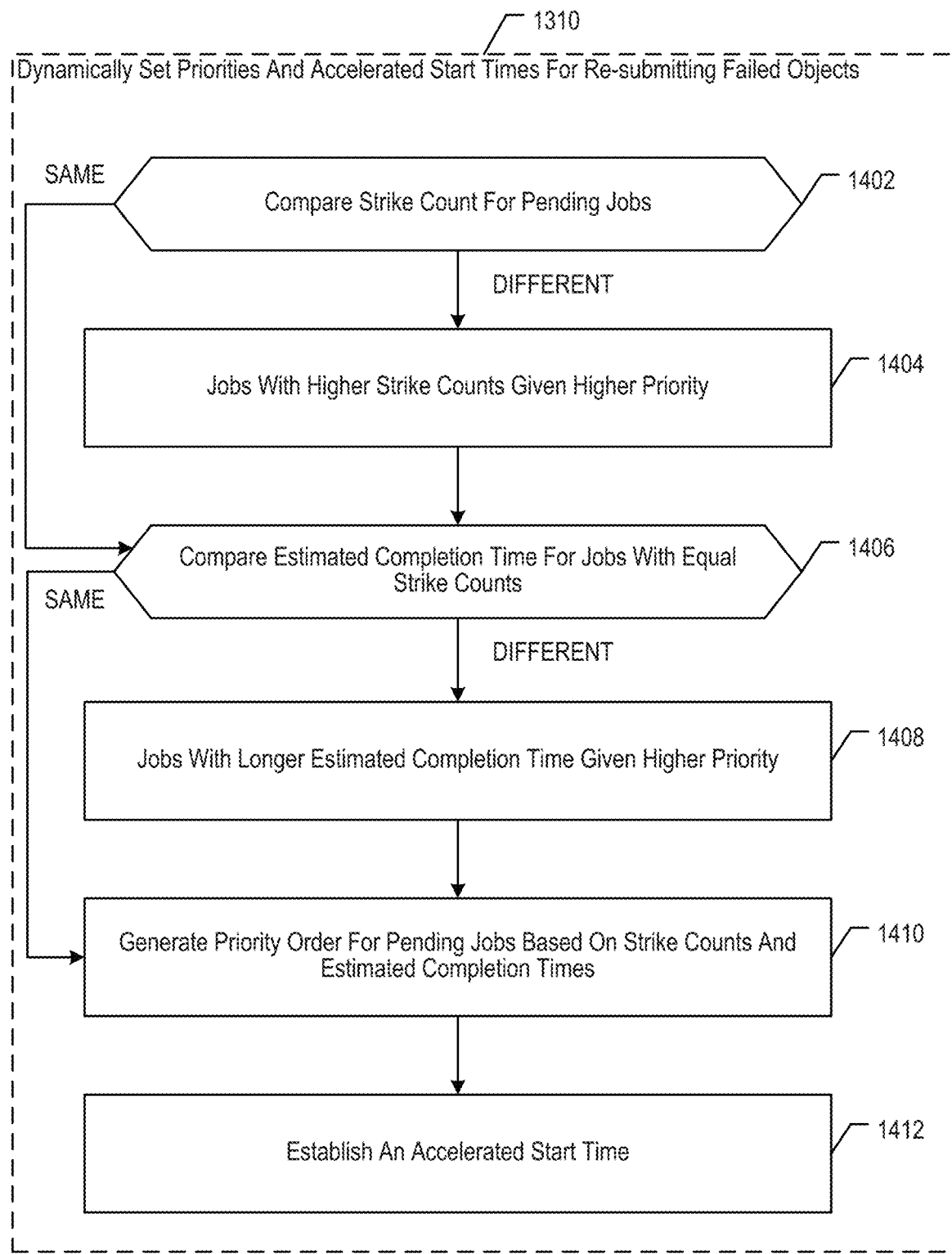
FIG. 14 depicts a flow chart of an illustrative block 1310 in block 910 of method 900.

FIG. 14 depicts a flow chart of an illustrative block 1310 in block 910 of method 900. In general, block 1310 is directed at the storage manager 740 dynamically setting priorities and accelerated start times for re-submitting failed data objects for backup in an attempt to meet the RPO. The principle behind this block is to analyze and organize the failed data objects and attempt to have them backed up on an accelerated schedule so that the RPO can still be met despite the failures. The initial job order will be dynamically re-evaluated and the pending failed data objects will be re-prioritized as explained in more detail below—again in order to increase the chances of getting all failed data objects backed up within the RPO.

At block 1402, which is a decision point, storage manager 740 compares those backup jobs that had failed data objects in the preceding round—comparing the respective strike count for each job. The Strike Count for a dataset (e.g., client, subclient) is defined as the number of failures that happened since the last successful backup job of the same backup level. This is computed dynamically. The strike count is incremented whether the backup job fails in whole or in part. A given job can fail several times, perhaps with progressively fewer failed data objects each time. Here, if a plurality of backup jobs have failed in whole or in part, their strike counts are compared. If all jobs have the same strike count, block 1404 is skipped and control passes to block 1406.

At block 1404, storage manager 740 gives higher priority to jobs with higher strike counts. Thus jobs with higher strike counts are given higher priority over those with lower strike counts, preliminarily ordering the backup jobs for re-submission in order of decreasing strike count and proceeding to block 1406.

At block 1406, which is a decision point, storage manager 740 compares estimated completion time for jobs with equal strike counts. Illustratively, since one or more of these backup jobs will have failed only in part, their respective estimated completion times need to be recalculated at this point, using only the failed data objects, illustratively using the technique described in block 1202.

At block 1408, storage manager 740 gives higher priority to jobs with longer estimated completion time, as determined in the preceding block, thereby ordering the backup jobs for re-submission in order of decreasing strike count and further in order of decreasing estimated completion time. Illustratively jobs with a strike count of 2 (twice failed) receive a higher priority than jobs with a strike count of 1 (once failed), and within these classifications, jobs with long estimated completion times will receive a higher priority than shorter ones. The resulting priority order is generated at block 1410, based on strike counts and estimated completion times. In alternative embodiments, storage manager 740 uses only one of these criteria for the prioritizing, not both. At this point, a priority order that storage manager 740 devised for the first round of backup jobs is superseded by the present priority order, which is dynamically determined based on failure conditions in the first round. Likewise, in a later round, the priority order will be determined afresh based on failure conditions in the second round.

At block 1412, storage manager 740 establishes an accelerated start time for each of the backup jobs that are slated for re-submission, illustratively using the technique described in block 1204. At this point, start times that storage manager 740 devised for the first round of backup jobs are superseded by the present start times directed only to failed data objects, and dynamically determined based on failure conditions in the first round. Likewise, in a later round, the start times for failed data objects will be determined afresh based on failure conditions in the second round. The aim is to progressively whittle down the number of failed data objects and get them backed up in time to meet the RPO.

FIG. 15 depicts a flow chart of an illustrative method 1500 according to an illustrative embodiment of the present invention. The method is illustratively performed by enhanced data agent 842, e.g., using logic 843. For simplicity, data agent 842 is recited as performing blocks 1502-1512, but in some embodiments these blocks are performed by enhanced media agent 844, e.g., using logic 845 and/or by data agent 842 and media agent 844 in any combination, without limitation.

At block 1502, data agent 842 reports to storage manager 740 an amount of changed data since a preceding successful backup job. It will be left to storage manager 740 to determine an appropriate backup level for the target dataset, e.g., client, subclient, that the data agent is associated with. See also FIG. 11.

At block 1504, data agent 842 receives from storage manager 740 an indication of a backup level for the next upcoming backup job, e.g., full, incremental, differential, synthetic full. See also FIG. 11.

At block 1506, data agent 842 receives from storage manager 740 an indication of data object granularity that is suitable to the type of client or subclient. For example, when the application associated with data agent 842 is a database, granularity is defined illustratively at one or more of the following levels: whole database, table, file groups. When the application is a file system, the granularity is defined at the volume level, file level, and/or at the folder/directory level. When the application is electronic mail (email), the granularity is defined at the mailbox level, email message level, and/or attachment level. When the application includes virtualization, the granularity is defined at the VM server level, virtual machine level, and/or the disk (e.g., VMDK) level. These are just some examples of data object granularity that is implemented in one or more illustrative embodiments, but the invention is not so limited, and other levels of granularity are possible as well. The level of granularity is reflected in the capability of the enhanced data agent 842 to identify and track data within the associated application and/or file system at the specified granularity level.

At block 1508, data agent 842 identifies all data objects in its target dataset (e.g., client, subclient) that are applicable to the pending backup job according to the granularity provided by storage manager 740. For example, for an incremental backup only data objects that changed since the preceding successful backup are identified, whereas all data objects are identified for a full backup. In some embodiments, a default level of granularity is configured in data agent 842 and no granularity indication is received from storage manager 740, i.e., data agent 842 applies the default level of granularity to its target dataset (e.g., client, subclient). Having identified all the target data objects to be backed up in the pending backup job, data agent 842 illustratively creates a data object catalogue (not shown) that it stores locally at the data agent and/or transmits the data object catalogue to storage manager 740.

Data agent 842 is now ready to proceed with the backup job, which also involves one or more media agents (e.g., 844) and one or more respectively associated data storage devices (e.g., 108) for storing the resulting backed up data, e.g., into secondary copy or copies 116. See, e.g., FIG. 1C, FIG. 8.

At block 1510, which occurs in the course of data agent 842 executing the backup job, data agent 842 tracks whether each data block targeted for the backup job is successfully backed up, i.e., stored to a secondary copy 116. To do this, data agent 842 tracks whether it is able to read each target data object, process it for backup (e.g., encapsulation, framing, tagging, compression, encryption, deduplication, etc.), and transmit it to the media agent(s) 844 assigned to the backup job. Additionally, after transmission to the media agent(s), data agent 842 continues tracking the data objects, by receiving status from the one or more media agents 844, and/or in some embodiments by querying the media agent(s) 844 to find out the status. In sum, data agent 842 knows whether each data objects targeted for backup in the present backup job was successfully backed up or not.

Accordingly, each media agent 844 is configured in some embodiments to receive from data agent 842 the data object catalogue for the present job and track the success/failure of backup up of each data object in the catalogue and report accordingly to data agent 842. In some embodiments, media agents 144 without the present enhancements are used in the backup jobs. Accordingly, data agent 842 is configured to interpret media agent status reports about successful and failed backup jobs.

At block 1512, data agent 842 reports to storage manager 740 metadata identifying data objects that failed backup. See also block 1302. Any reasons for failure that are known to data agent 842 (e.g., locked data, crashed application, etc.) are also reported by data agent 842 to storage manager 740. See also block 1304.

In analogous fashion, media agent(s) 844 are enhanced to report to storage manager 740 metadata identifying data objects that failed backup. See also block 1302. Any reasons for failure that are known to media agent 844 (e.g., storage device space limits, storage device down, etc.) are also reported by media agent 844 to storage manager 740. See also block 1304. Results of the backup job are stored by media agent 844 to RPO results 853. Data objects that were successfully backed up in an RPO driven backup job are indexed in media agent database 852, e.g., in RPO results 853 and/or index 153. Data objects that failed to be backed up are individually reported and status stored to RPO results 853. In some embodiments, RPO results 853 are part of index 153. Results 853 are reported in whole or in part to storage manager 740 at the end of a backup job and/or on demand. See also FIG. 8.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, data structures are differently organized and/or stored to another location than recited above. In some embodiments, a different component may initiate or execute a given operation.

EXAMPLE EMBODIMENTS

Some example enumerated embodiments of the present invention are recited in this section in the form of methods, systems, and non-transitory computer-readable media, without limitation.

According to an illustrative embodiment of the present invention, a data storage management system comprising: a storage manager that executes on a computing device comprising one or more processors and computer memory; and wherein the storage manager is configured to: manage storage operations and backup jobs in the data storage management system, and determine a backup level for a first backup job of a first dataset, wherein the backup level is based on at least one of: a recovery point objective (RPO), a backup window, and a data retention interval for backed up data from the first dataset. The above-recited system wherein the backup level is based on a combination of: the recovery point objective (RPO) and the backup window and an amount of data to be backed up from the first dataset. The above-recited system wherein the backup level is one of: a full backup, an incremental backup, a differential backup, and a synthetic-full backup. The above-recited system wherein the storage manager is further configured to: determine an expected duration of the first backup job at the backup level, based on a plurality of previous backup jobs for the first dataset. The above-recited system wherein the storage manager is further configured to: determine an expected duration of the first backup job; and determine a first start time for the first backup job sufficient to meet the RPO within the backup window, based at least in part on: the expected duration of the first backup job, respective expected durations of other pending backup jobs, and a failure history for previous backup jobs associated with the first dataset. The above-recited system wherein the storage manager is further configured to: determine a first start time for the first backup job within the backup window, wherein the first start time is sufficient to allow the storage manager to re-submit one or more data objects that failed to be backed up in the first backup job to be backed up in a second backup job to meet the recovery point objective (RPO). The above-recited system wherein the storage manager is further configured to: re-submit one or more data objects that failed to be backed up in the first backup job to a second backup job to be completed within the recovery point objective (RPO).

The above-recited system wherein the storage manager is further configured to: dynamically determine a priority order of pending backup jobs when one or more data objects fail to be backed up in the first backup job; and wherein information about the failed one or more data objects is received from at least one of a data agent and a media agent involved in performing the first backup job. The above-recited system wherein the storage manager is further configured to: dynamically determine a priority order of pending backup jobs when one or more data objects fail to be backed up in the first backup job; and wherein among the pending backup jobs a given pending backup job with a higher failure count is given higher priority over another pending backup job with a lower failure count. The above-recited system wherein the storage manager is further configured to: dynamically determine a priority order of pending backup jobs when one or more data objects fail to be backed up in the first backup job; and wherein among pending backup jobs with identical failure counts a given pending backup job with a longer estimated completion time is given priority over another pending backup job with a lower estimated completion time. The above-recited system wherein the storage manager is further configured to: receive information from a data agent involved in the first backup job indicating that one or more data objects failed to be backed up in the first backup job; and re-submit the one or more data objects to be backed up in a second backup job scheduled to meet the recovery point objective (RPO).

The above-recited system wherein the backup level is also based on an amount of data to be backed up from the first dataset. The above-recited system wherein the storage manager is further configured to: determine whether the recovery point objective (RPO) is achievable based on the backup level and an amount of data to be backed up from the first dataset. The above-recited system wherein the storage manager is further configured to: determine an expected duration of the first backup job at the backup level, based on at least one of: a plurality of previous backup jobs for the first dataset; one or more network characteristics; an amount of data to be backed up from the first dataset, a number of media agents for storing backed up data generated in the first backup job to respective associated data storage devices; characteristics of the one or more media agents; characteristics of the data storage devices; and geo-location rule associated with where the dataset is located. The above-recited system wherein the storage manager is further configured to: use machine learning to determine an expected duration of the first backup job at the activated backup level, based on at least one of: a plurality of previous backup jobs; one or more network characteristics; an amount of data to be backed up from the first dataset, a number of media agents for storing backed up data generated in the first backup job to respective associated data storage devices; characteristics of the one or more media agents; characteristics of the data storage devices; and geo-location rule associated with where the dataset is located. The above-recited system wherein the storage manager is further configured to: Dynamically determine a priority order of pending backup jobs when one or more data objects fail to be backed up in the first backup job; Wherein among the pending backup jobs a given backup job with a higher failure count is given higher priority over another pending backup job with lower failure count, and Wherein among a plurality of pending jobs with identical failure counts a given backup job with a longer estimated completion time is given priority over another backup job with a lower estimated completion time. The above-recited system wherein the storage manager is further configured to: Dynamically determine a priority order of pending backup jobs when one or more data objects fail to be backed up in the first backup job, wherein the priority order is changes based on a respective failure count for each of the pending backup jobs and further based on a respective estimated completion time for each of the pending backup jobs. The above-recited system wherein the recovery point objective (RPO) is expressed as a backup frequency. The above-recited system wherein the first dataset is expressed as a subclient in the data storage management system. The above-recited system wherein the storage manager is further configured to: determine an expected duration of the first backup job; and use machine learning to determine a first start time for the first backup job within the backup window sufficient to meet the RPO, based at least in part on: the expected duration of the first backup job, respective expected durations of other pending backup jobs, and a failure history for previous backup jobs associated with the first dataset. The above-recited system wherein the storage manager is further configured to: Determine a first start time for the first backup job within the backup window sufficient to meet the RPO. The above-recited system wherein the storage manager is further configured to: based on a failure history of previous backup jobs associated with the first dataset, Determine a first start time for the first backup job within the backup window sufficient to meet the recovery point objective (RPO). The above-recited system wherein the storage manager is further configured to: based on a failure history of previous backup jobs, Determine a first start time for the first backup job within the backup window sufficient to meet the RPO.

According to another embodiment, a method comprising: determining a backup level for a first backup job of a first dataset, wherein the backup level is based on a combination of: a recovery point objective (RPO), a backup window, and an amount of data to be backed up from the first dataset; and wherein the determining is performed by a storage manager that executes on a computing device comprising one or more processors and computer memory and manages storage operations and backup jobs in the data storage management system, including the first backup job. The above-recited method wherein the backup level is one of: a full backup, an incremental backup, a differential backup, and a synthetic-full backup; and determining by the storage manager an expected duration of the first backup job at the backup level, based on a plurality of previous backup jobs for the first dataset. The above-recited method further comprising: determining by the storage manager an expected duration of the first backup job at the backup level; and determining by the storage manager a first start time for the first backup job within the backup window sufficient to meet the recovery point objective (RPO), based at least in part on: the expected duration of the first backup job, respective expected durations of other pending backup jobs, and a failure history for previous backup jobs associated with the first dataset. The above-recited method further comprising: determining by the storage manager a first start time for the first backup job within the backup window, wherein the first start time is sufficient to allow the storage manager to re-submit one or more data objects that failed to be backed up in the first backup job to be backed up in a second backup job to meet the recovery point objective (RPO). The above-recited method further comprising: dynamically determining by the storage manager a priority order of pending backup jobs when one or more data objects fail to be backed up in the first backup job; and wherein among the pending backup jobs a given pending backup job with a higher failure count is given higher priority over another pending backup job with a lower failure count.

According to another example embodiment, a non-transitory computer readable medium storing instructions, which when executed by at least one computing device comprising one or more processors and computer memory, perform operations comprising: determining a backup level for a first backup job of a first dataset, wherein the backup level is based on a combination of: a recovery point objective (RPO), a backup window, and an amount of data to be backed up from the first dataset, wherein the determining is performed by a storage manager that executes on a computing device comprising one or more processors and computer memory, and wherein the backup level is one of: a full backup, an incremental backup, a differential backup, and a synthetic-full backup; and determining an expected duration of the first backup job at the backup level, based on a plurality of previous backup jobs for the first dataset. The above-recited non-transitory computer readable medium wherein the operations further comprise: determining a first start time for the first backup job within the backup window sufficient to meet the recovery point objective (RPO), based at least in part on: the expected duration of the first backup job, respective expected durations of other pending backup jobs, and a failure history for previous backup jobs associated with the first dataset. The above-recited non-transitory computer readable medium wherein the operations further comprise: determining by the storage manager a first start time for the first backup job within the backup window, wherein the first start time is sufficient to allow the storage manager to re-submit one or more data objects that failed to be backed up in the first backup job to be backed up in a second backup job to meet the recovery point objective (RPO); and re-submitting the one or more data objects that failed to be backed up in the first backup job to the second backup job to be completed within the recovery point objective (RPO). The above-recited non-transitory computer readable medium wherein the operations further comprise: dynamically determining a priority order of pending backup jobs when one or more data objects fail to be backed up in the first backup job; wherein among the pending backup jobs a given backup job with a higher failure count is given higher priority over another pending backup job with a lower failure count; and wherein among the pending jobs with identical failure counts a given backup job with a longer estimated completion time is given priority over another backup job with a lower estimated completion time.

According to another example aspect of the invention and embodiment comprises a data storage management system comprising: a data agent associated with an application that generates a dataset, wherein the data agent executes on a computing device comprising one or more processors and computer memory; wherein the data agent is configured to: identify data objects within the dataset based on a granularity level, and track which data objects were successfully backed up in a first backup job and which data objects failed to be backed up in the first backup job. The above-recited system wherein the data agent is further configured to: process the data objects for backup in the first backup job; report to a storage manager which data objects failed to be backed up in the first backup job; and wherein the data storage management system further comprises the storage manager, which executes on a computing device comprising one or more processors and computer memory, and wherein the storage manager is configured to manage storage operations, including the first backup job, in the data storage management system. The above-recited system wherein the data agent is further configured to: receive the granularity level from a storage manager; report to the storage manager which data objects failed to be backed up in the first backup job; and wherein the data storage management system further comprises the storage manager, which executes on a computing device comprising one or more processors and computer memory, and wherein the storage manager is configured to manage storage operations, including the first backup job, in the data storage management system. The above-recited system wherein the data agent is further configured to: track which data objects were successfully backed up in the first backup job and which data objects failed to be backed up in the first backup job by communicating with a media agent; and wherein the data storage management system further comprises the media agent, which executes on a computing device comprising one or more processors and computer memory, and wherein the media agent is configured to store backed up data objects to one or more storage devices. The above-recited system wherein the data agent is further configured to: process the data objects for backup in the first backup job; transmit the processed data objects to a media agent in the first backup job; track which data objects were successfully backed up in the first backup job and which data objects failed to be backed up in the first backup job by communicating with the media agent, including receiving backup status from the media agent; wherein the data storage management system further comprises the media agent, which executes on a computing device comprising one or more processors and computer memory, and wherein the media agent is configured to store backed up data objects to one or more storage devices. The above-recited system wherein the data agent is further configured to: in the first backup job, process the data objects for backup; report to a storage manager which data objects failed to be backed up in the first backup job; in a second backup job, process the data objects that failed to be backed up in the first backup job, based on instructions received from the storage manager; wherein the data storage management system further comprises the storage manager, which executes on a computing device comprising one or more processors and computer memory, and wherein the storage manager is configured to manage storage operations, including the first backup job and the second backup job, in the data storage management system; and wherein a schedule for the second backup job is devised by the storage manager to meet a recovery point objective (RPO) administered in the storage manager. The above-recited system wherein the data agent is further configured to: in the first backup job, process the data objects for backup; report to a storage manager which data objects failed to be backed up in the first backup job; in a second backup job, process the data objects that failed to be backed up in the first backup job, based on a schedule received from the storage manager; wherein the data storage management system further comprises the storage manager, which executes on a computing device comprising one or more processors and computer memory, and wherein the storage manager is configured to manage storage operations, including the first backup job and the second backup job, in the data storage management system; and wherein the schedule for the second backup job is devised to meet a recovery point objective (RPO) administered in the storage manager. The above-recited system wherein a media agent identifies and/or reports on data objects at the granularity level the same as the data agent.

In yet another example embodiment, a data storage management system comprising: a data agent associated with an application, wherein the data agent executes on a computing device comprising one or more processors and computer memory, and wherein the application generates a dataset; wherein the data agent is configured to: identify data objects within the dataset based on a granularity level, process the data objects for backup in a first backup job, track which of the data objects were successfully backed up in the first backup job and which of the data objects failed to be backed up in the first backup job, and report to the storage manager which data objects failed to be backed up in the first backup job; and the storage manager, which executes on a computing device comprising one or more processors and computer memory, and wherein the storage manager manages storage operations, including the first backup job, in the data storage management system, and wherein a schedule for the first backup job is based on a recovery point objective (RPO). The above-recited system wherein the data agent is further configured to receive the granularity level from the storage manager. The above-recited system further comprising: a media agent that executes on a computing device comprising one or more processors and computer memory, and wherein the media agent is configured to store backed up data objects to one or more storage devices; and wherein the data agent is further configured to receive backup status from the media agent about the data objects in the first backup job. The above-recited system wherein the storage manager is configured to: instruct the data agent to back up, in a second backup job that follows the first backup job, the data objects that failed to be backed up in the first backup job and not the data objects that were successfully backed up in the first backup job, wherein a schedule for the second backup job is devised to meet the recovery point objective (RPO), which is administered into the storage manager. The above-recited system wherein the data agent is further configured to: based on instructions from the storage manager, process for backup, in a second backup job that follows the first backup job, the data objects that failed to be backed up in the first backup job and not the data objects that were successfully backed up in the first backup job. The above-recited system wherein a media agent identifies and/or reports on data objects at the granularity level the same as the data agent.

According to one more illustrative embodiment, a method comprising: identifying, by a data agent in a data storage management system, data objects within a dataset based on a granularity level; processing, by the data agent, the data objects for backup in a first backup job; tracking, by the data agent, which of the data objects were successfully backed up in the first backup job and which of the data objects failed to be backed up in the first backup job; reporting by the data agent to a storage manager which data objects failed to be backed up in the first backup job; wherein the data agent is associated with an application that generates the dataset, and wherein the data agent executes on a computing device comprising one or more processors and computer memory; and wherein the storage manager executes on a computing device comprising one or more processors and computer memory, and wherein the storage manager manages storage operations, including the first backup job, in the data storage management system. The above-recited method wherein the data agent receives the granularity level from the storage manager. The above-recited method further comprising: receiving, by the data agent from a media agent, status about the data objects in the first backup job; and wherein the media agent executes on a computing device comprising one or more processors and computer memory, and wherein the media agent is configured to store backed up data objects to one or more storage devices in the data storage management system. The above-recited method further comprising: instructing the data agent, by the storage manager, to back up, in a second backup job that follows the first backup job, the data objects that failed to be backed up in the first backup job and not the data objects that were successfully backed up in the first backup job. The above-recited method further comprising: receiving, by the data agent from the storage manager, instructions to process for backup, in a second backup job that follows the first backup job, the data objects that failed to be backed up in the first backup job and not the data objects that were successfully backed up in the first backup job, wherein a schedule for the second backup job is devised to meet a recovery point objective (RPO). The above-recited method wherein a media agent identifies and/or reports on data objects at the granularity level the same as the data agent.

According to yet another illustrative embodiment a method comprising: identifying, by a media agent in a data storage management system, data objects within a dataset based on a granularity level; processing, by the media agent, the data objects for backup in a first backup job; tracking, by the media agent, which of the data objects were successfully backed up in the first backup job and which of the data objects failed to be backed up in the first backup job; reporting by the media agent to a storage manager which data objects failed to be backed up in the first backup job; wherein the media agent is associated with a data storage device for storing the backed up data, and wherein the media agent executes on a computing device comprising one or more processors and computer memory; and wherein the storage manager executes on a computing device comprising one or more processors and computer memory, and wherein the storage manager media manages storage operations, including the first backup job, in the data storage management system. The above-recited method wherein the media agent receives the granularity level from the storage manager. The above-recited method further comprising: receiving, by the media agent from a data agent, status about the data objects in the first backup job; and wherein the data agent executes on a computing device comprising one or more processors and computer memory, and wherein the data agent is associated with an application that generates the dataset. The above-recited method further comprising: instructing the media agent, by the storage manager, to back up, in a second backup job that follows the first backup job, the data objects that failed to be backed up in the first backup job and not the data objects that were successfully backed up in the first backup job. The above-recited method further comprising: receiving, by the media agent from the storage manager, instructions to process for backup, in a second backup job that follows the first backup job, the data objects that failed to be backed up in the first backup job and not the data objects that were successfully backed up in the first backup job, wherein a schedule for the second backup job is devised to meet a recovery point objective (RPO).

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage management system comprising:
a computing device comprising one or more hardware processors, wherein the computing device is programmed to execute a storage manager, which comprises a recovery point objective (RPO) that is administered to define a maximum duration of time since a point in time representing recoverable backed up data of a dataset; and
wherein the computing device executing the storage manager is configured to:
manage backup jobs in the data storage management system,
determine a backup level for a first backup job of the dataset,
wherein the backup level is based on (i) the RPO, (ii) a backup window that includes one or more periods of time when performing the first backup job is permissible within the data storage management system, and (iii) an amount of data to be backed up from the dataset,
determine a start time for the first backup job,
wherein the start time is not pre-administered in the data storage management system, and
wherein the start time is within the backup window and sufficient to complete the first backup job within the RPO, and
at the start time, initiate the first backup job of the dataset at the backup level.

2. The system of claim 1 wherein the backup level is further based on a data retention interval for the recoverable backed up data of the dataset.

3. The system of claim 1 wherein the backup level is one of: a full backup, an incremental backup, a differential backup, and a synthetic-full backup.

4. The system of claim 1 wherein the computing device executing the storage manager is further configured to:
determine an expected duration of the first backup job at the backup level, based on a plurality of previous backup jobs for the dataset, and wherein the start time for the first backup job is further based on the expected duration.

5. The system of claim 1 wherein the computing device executing the storage manager is further configured to:
determine an expected duration of the first backup job at the backup level; and
wherein the start time is based on: the expected duration of the first backup job, respective expected durations of other pending backup jobs, and a failure history for previous backup jobs associated with the dataset.

6. The system of claim 1 wherein the start time is sufficient to allow the storage manager to re-submit one or more data objects that failed to be backed up in the first backup job to a second backup job to meet the RPO for the dataset.

7. The system of claim 1 wherein the computing device executing the storage manager is further configured to:
re-submit one or more data objects that failed to be backed up in the first backup job to a second backup job to be completed within the RPO, wherein the storage manager excludes from the second backup job any data objects of the dataset that were successfully backed up in the first backup job.

8. The system of claim 1 wherein the computing device executing the storage manager is further configured to:
re-submit one or more data objects that failed to be backed up in the first backup job to a second backup job to be completed within the RPO, wherein the second backup job is re-submitted at a time that is based at least in part on one or more failure conditions that caused the one or more data objects to fail to be backed up in the first backup job.

9. The system of claim 1, wherein the computing device executing the storage manager is further configured to:
when one or more data objects fail to be backed up in the first backup job, accelerate a start time for a second backup job relative to other pending backup jobs so that the RPO for the dataset is met, wherein the second backup job backs up the one or more data objects that failed to be backed up in the first backup job and excludes any data objects of the dataset that were successfully backed up in the first backup job.

10. The system of claim 1 wherein the computing device executing the storage manager is further configured to:
when one or more data objects fail to be backed up in the first backup job, determine a priority order of pending backup jobs, giving a higher priority to a pending backup job with a higher prior-failure count over another pending backup job with a lower prior-failure count.

11. The system of claim 1 wherein the computing device executing the storage manager is further configured to:
when one or more data objects fail to be backed up in the first backup job, determine a priority order of pending backup jobs, wherein as between two pending backup jobs having a same prior-failure count, giving a higher priority to a pending backup job with a longer estimated completion time over another pending backup job with a shorter estimated completion time.

12. The system of claim 1 further comprising:
a data agent associated with an application that generates the dataset,
wherein the data agent executes on a computing device comprising one or more hardware processors;
wherein the computing device executing the data agent is configured to:
identify data objects within the dataset based on a granularity level,
process the data objects for backup in the first backup job,
track first data objects of the dataset that were successfully backed up in the first backup job,
report to the storage manager that second data objects of the dataset failed to be backed up in the first backup job, and
in a second backup job, process for backup the second data objects that failed to be backed up in the first backup job; and
wherein the computing device executing the storage manager is further configured to:
re-submit the second data objects to the second backup job to be completed within the RPO.

13. The system of claim 12 further comprising:
a media agent that executes on a computing device comprising one or more hardware processors, wherein the media agent is communicatively coupled with one or more storage devices for storing backup copies of the dataset resulting from at least the first backup job and the second backup job; and
wherein the computing device executing the media agent is configured to communicate to the data agent that the first data objects of the dataset were successfully backed up in the first backup job and that the second data objects of the dataset failed to be backed up in the first backup job.

14. A method comprising:
by a storage manager that executes on a computing device comprising one or more hardware processors, wherein the storage manager manages backup jobs in a data storage management system:
determining a backup level for a first backup job of a dataset,
wherein the backup level is based on a combination of:
a recovery point objective (RPO) that defines a maximum duration of time since a point in time representing recoverable backed up data of the dataset,
a backup window that includes one or more periods of time when performing the first backup job is permissible within the data storage management system, and
an amount of data to be backed up from the dataset;
determining a start time for the first backup job within the backup window,
wherein the start time is sufficient to complete the first backup job within the RPO and to allow the storage manager to re-submit one or more data objects that failed to be backed up in the first backup job to a second backup job to also complete within the RPO, and
wherein the start time is not pre-administered in the data storage management system; and
at the start time, initiating the first backup job of the dataset at the backup level.

15. The method of claim 14, wherein the backup level is one of: a full backup, an incremental backup, a differential backup, and a synthetic-full backup; and
further comprising: determining by the storage manager an expected duration of the first backup job at the backup level, based on a plurality of previous backup jobs for the dataset.

16. The method of claim 14, wherein the start time for the first backup job within the backup window is based at least in part on: an expected duration of the first backup job, respective expected durations of other pending backup jobs, and a failure history for previous backup jobs associated with the dataset.

17. The method of claim 14 further comprising:
by the storage manager submitting the second backup job at a time based at least in part on one or more failure conditions that caused the one or more data objects to fail to be backed up in the first backup job.

18. The method of claim 14 further comprising:
by the storage manager, when determining that one or more data objects failed to be backed up in the first backup job, accelerating a start time for the second backup job relative to other pending backup jobs so that the RPO for the dataset is met, wherein the storage manager excludes from the second backup job any data objects of the dataset that were successfully backed up in the first backup job.

19. The method of claim 14 further comprising:

by a data agent associated with an application that generates the dataset, wherein the data agent executes on a computing device comprising one or more hardware processors:

processing data objects in the dataset for backup in the first backup job, tracking first data objects of the dataset that were successfully backed up in the first backup job, reporting to the storage manager that second data objects of the dataset failed to be backed up in the first backup job, and in a second backup job, processing for backup the second data objects that failed to be backed up in the first backup job; and by the storage manager, submitting the second data objects to the second backup job to be completed within the RPO.

20. The method of claim 19, wherein the storage manager excludes from the second backup job the first data objects of the dataset that were successfully backed up in the first backup job, and wherein the storage manager accelerates a schedule for the second backup job relative to other pending backup jobs to meet the RPO for the dataset, including the first data objects and the second data objects.

* * * * *